US012586114B2

(12) United States Patent
Mitra et al.

(10) Patent No.: US 12,586,114 B2
(45) Date of Patent: Mar. 24, 2026

(54) GENERATING DIGITAL RECOMMENDATIONS UTILIZING COLLABORATIVE FILTERING, REINFORCEMENT LEARNING, AND INCLUSIVE SETS OF NEGATIVE FEEDBACK

(71) Applicant: Adobe Inc., San Jose, CA (US)

(72) Inventors: Saayan Mitra, San Jose, CA (US);
Xiang Chen, Palo Alto, CA (US);
Vahid Azizi, Piscataway, PA (US)

(73) Assignee: Adobe Inc., San Jose, CA (US)

( * ) Notice: Subject to any disclaimer, the term of this patent is extended or adjusted under 35 U.S.C. 154(b) by 1108 days.

(21) Appl. No.: 17/367,134

(22) Filed: Jul. 2, 2021

(65) Prior Publication Data

US 2023/0022396 A1     Jan. 26, 2023

(51) Int. Cl.
*G06N 3/044* (2023.01)
*G06F 18/21* (2023.01)
(Continued)

(52) U.S. Cl.
CPC ..... *G06Q 30/0631* (2013.01); *G06F 18/2178* (2023.01); *G06N 3/044* (2023.01); *G06N 3/088* (2013.01); *G06Q 30/0202* (2013.01)

(58) Field of Classification Search
CPC ........... G06Q 30/0631; G06Q 30/0202; G06Q 30/0641; G06F 18/2178; G06N 3/044; G06N 3/088
See application file for complete search history.

(56) References Cited

U.S. PATENT DOCUMENTS 10,929,743 B2 *  2/2021  Liu ........................ G06N 3/006
2014/0122502 A1 *  5/2014  Kalmes ................. G06F 16/284
(Continued)

OTHER PUBLICATIONS

Zhao, Xiangyu, et al. "Deep reinforcement learning for page-wise recommendations." (Year: 2018).*
(Continued)

*Primary Examiner* — Ryan Barrett
*Assistant Examiner* — Matiyas T Maru
(74) *Attorney, Agent, or Firm* — Keller Preece PLLC

(57) ABSTRACT

The present disclosure relates to systems, methods, and non-transitory computer readable media that utilize collaborative filtering and a reinforcement learning model having an actor-critic framework to provide digital content items across client devices. In particular, in one or more embodiments, the disclosed systems monitor interactions of a client device with one or more digital content items to generate item embeddings (e.g., utilizing a collaborative filtering model). The disclosed systems further utilize a reinforcement learning model to generate a recommendation (e.g., determine one or more additional digital content items to provide to the client device) based on the user interactions. In some implementations, the disclosed systems utilize the reinforcement learning model to analyze every negative and positive interaction observed when generating the recommendation. Further, the disclosed systems utilize the reinforcement learning model to analyze item embeddings, which encode the relationships among the digital content items, when generating the recommendation.

20 Claims, 18 Drawing Sheets

100

(51) Int. Cl.
  G06N 3/088 (2023.01)
  G06Q 30/0202 (2023.01)
  G06Q 30/0601 (2023.01)

(56) References Cited

U.S. PATENT DOCUMENTS

| 2017/0140263 A1* | 5/2017 | Kaiser | G06N 3/0445 |
| 2018/0089553 A1 | 3/2018 | Liu et al. | |
| 2018/0240030 A1* | 8/2018 | Shen | G06N 7/005 |
| 2021/0082471 A1* | 3/2021 | Detroja | G06F 18/22 |
| 2022/0270155 A1* | 8/2022 | Volkovs | G06Q 30/0631 |

OTHER PUBLICATIONS

Han, Jianhua, et al. "Optimizing ranking algorithm in recommender system via deep reinforcement learning." (Year: 2019).*

He, Xiangnan, et al. "Fast matrix factorization for online recommendation with implicit feedback." (Year: 2016).*

Wang, Xiang, et al. "Reinforced negative sampling over knowledge graph for recommendation." (Year: 2020).*

Wang, Wei, and Longbing Cao. "Interactive sequential basket recommendation by learning basket couplings and positive/negative feedback." (Year: 2021).*

Liu, Feng, et al. "Deep reinforcement learning based recommendation with explicit user-item interactions modeling." (Year: 2018).*

Wang, et al. Learning performance prediction via convolutional GRU and explainable neural networks in e-learning environments (Year: 2019).*

Zhao, Xiangyu, et al. "Recommendations with negative feedback via pairwise deep reinforcement learning." (Year: 2018).*

Wang, et al., "Interactive sequential basket recommendation by learning basket couplings and positive/negative feedback" (Year: 2021).*

Rendle, Steffen, et al. "BPR: Bayesian personalized ranking from implicit feedback" (Year: 2012).*

Kai Arulkumaran, Marc Peter Deisenroth, Miles Brundage, and Anil Anthony Bharath. 2017. Deep reinforcement learning: A brief survey. IEEE Signal Processing Magazine 34, 6 (2017), 26-38.

Nicolas Ballas, Li Yao, Chris Pal, and Aaron Courville. 2015. Delving deeper into convolutional networks for learning video representations. arXiv preprint arXiv:1511.06432 (2015).

Yoshua Bengio, Patrice Simard, and Paolo Frasconi. 1994. Learning long-term dependencies with gradient descent is difficult. IEEE transactions on neural networks 5, 2 (1994), 157-166.

José Bento, Stratis Ioannidis, S Muthukrishnan, and Jinyun Yan. 2013. A time and space efficient algorithm for Contextual Linear Bandits. In Joint European Conference on Machine Learning and Knowledge Discovery in Databases. Springer, 257-272.

Xiaocong Chen, Chaoran Huang, Lina Yao, Xianzhi Wang, Wei Liu, and Wenjie Zhang. 2020. Knowledge-guided Deep Reinforcement Learning for Interactive Recommendation. arXiv:2004.08068 [cs. IR].

Xu Chen, Hongteng Xu, Yongfeng Zhang, Jiaxi Tang, Yixin Cao, Zheng Qin, and Hongyuan Zha. 2018. Sequential Recommendation with User Memory Networks. 108-116.

Heng-Tze Cheng, Levent Koc, Jeremiah Harmsen, Tal Shaked, Tushar Chandra, Hrishi Aradhye, Glen Anderson, Greg Corrado, Wei Chai, Mustafa Ispir, et al. 2016. Wide & deep learning for recommender systems. In Proceedings of the 1st workshop on deep learning for recommender systems. 7-10.

Wei Chu, Lihong Li, Lev Reyzin, and Robert Schapire. 2011. Contextual bandits with linear payoff functions. In Proceedings of the Fourteenth International Conference on Artificial Intelligence and Statistics. JMLR Workshop and Conference Proceedings, 208-214.

Junyoung Chung, Caglar Gulcehre, KyungHyun Cho, and Yoshua Bengio. 2014. Empirical evaluation of gated recurrent neural networks on sequence modeling. arXiv preprint arXiv:1412.3555 (2014).

Mukund Deshpande and George Karypis. 2004. Item-based top-n recommendation algorithms. ACM Transactions on Information Systems (TOIS) 22, 1 (2004), 143-177.

Georges E Dupret and Benjamin Piwowarski. 2008. A user browsing model to predict search engine click data from past observations.. In Proceedings of the 31st annual international ACM SIGIR conference on Research and development in information retrieval. 331-338.

Scott Fujimoto, Herke van Hoof, and David Meger. 2018. Addressing Function Approximation Error in Actor-Critic Methods. In Proceedings of the 35th International Conference on Machine Learning. PMLR, 1582-1591.

Kun Gai, Xiaoqiang Zhu, Han Li, Kai Liu, and Zhe Wang. 2017. Learning piece-wise linear models from large scale data for ad click prediction. arXiv preprint arXiv:1704.05194 (2017).

Felix A Gers, Jürgen Schmidhuber, and Fred Cummins. 1999. Learning to forget: Continual prediction with LSTM. (1999).

Huifeng Guo, Ruiming Tang, Yunming Ye, Zhenguo Li, and Xiuqiang He. 2017. DeepFM: a factorization-machine based neural network for CTR prediction. arXiv preprint arXiv:1703.04247 (2017).

F. Maxwell Harper and Joseph A. Konstan. 2015. The MovieLens Datasets: History and Context. In ACM Transactions on Interactive Intelligent Systems (TiiS), vol. 5.

Ruining He and Julian McAuley. 2016. Ups and downs: Modeling the visual evolution of fashion trends with one-class collaborative filtering. In proceedings of the 25th international conference on world wide web. 507-517.

Xiangnan He, Lizi Liao, Hanwang Zhang, Liqiang Nie, Xia Hu, and Tat-Seng Chua. 2017. Neural collaborative filtering. In Proceedings of the 26th international conference on world wide web. 173-182.

Xiangnan He, Hanwang Zhang, Min-Yen Kan, and Tat-Seng Chua. 2016. Fast matrix factorization for online recommendation with implicit feedback. In Proceedings of the 39th International ACM SIGIR conference on Research and Development in Information Retrieval. 549-558.

Yujing Hu, Qing Da, Anxiang Zeng, Yang Yu, and Yinghui Xu. 2018. Reinforcement learning to rank in e-commerce search engine: Formalization, analysis, and application. In Proceedings of the 24th ACM SIGKDD International Conference on Knowledge Discovery & Data Mining. 368-377.

Yuchin Juan, Yong Zhuang, Wei-Sheng Chin, and Chih-Jen Lin. 2016. Field-aware factorization machines for CTR prediction. In Proceedings of the 10th ACM conference on recommender systems. 43-50.

Vijay R Konda and John N Tsitsiklis. 2003. Onactor-critic algorithms. SIAM journal on Control and Optimization 42, 4 (2003), 1143-1166.

Joseph A Konstan, Bradley N Miller, David Maltz, Jonathan L Herlocker, Lee R Gordon, and John Riedl. 1997. Grouplens: Applying collaborative filtering to usenet news. Commun. ACM 40, 3 (1997), 77-87.

Yehuda Koren, Robert Bell, and Chris Volinsky. 2009. Matrix factorization techniques for recommender systems. Computer 42, 8 (2009), 30-37.

Lihong Li, Wei Chu, John Langford, and Robert E Schapire. 2010. A contextual-bandit approach to personalized news article recommendation. In Proceedings of the 19th international conference on World wide web. 661-670.

Jianxun Lian, Xiaohuan Zhou, Fuzheng Zhang, Zhongxia Chen, Xing Xie, and Guangzhong Sun. 2018. xdeepfm: Combining explicit and implicit feature interactions for recommender systems. In Proceedings of the 24th ACM SIGKDD International Conference on Knowledge Discovery & Data Mining. 1754-1763.

Timothy P Lillicrap, Jonathan J Hunt, Alexander Pritzel, Nicolas Heess, Tom Erez, Yuval Tassa, David Silver, and Daan Wierstra. 2015. Continuous control with deep reinforcement learning. arXiv preprint arXiv:1509.02971 (2015).

Greg Linden, Brent Smith, and Jeremy York. 2003. Amazon.com recommendations: Item-to-item collaborative filtering. IEEE Internet computing 7, 1 (2003), 76-80.

Feng Liu, Ruiming Tang, Xutao Li, Yunming Ye, Haokun Chen, Huifeng Guo, and Yuzhou Zhang. 2018. Deep Reinforcement

(56) References Cited

OTHER PUBLICATIONS

Learning based Recommendation with Explicit User-Item Interactions Modeling. CoRR abs/1810.12027 (2018). arXiv:1810.12027 http://arxiv.org/abs/1810.12027.

Hao Ma, Irwin King, and Michael R Lyu. 2007. Effective missing data prediction for collaborative filtering. In Proceedings of the 30th annual international ACM SIGIR conference on Research and development in information retrieval. 39-46.

Julian McAuley, Christopher Targett, Qinfeng Shi, and Anton Van Den Hengel. 2015. Image-based recommendations on styles and substitutes. In Proceedings of the 38th international ACM SIGIR conference on research and development in information retrieval. 43-52.

H Brendan McMahan, Gary Holt, David Sculley, Michael Young, Dietmar Ebner, Julian Grady, Lan Nie, Todd Phillips, Eugene Davydov, Daniel Golovin, et al. 2013. Ad click prediction: a view from the trenches. In Proceedings of the 19th ACM SIGKDD international conference on Knowledge discovery and data mining. 1222-1230.

Raymond J Mooney and Loriene Roy. 2000. Content-based book recommending using learning for text categorization. In Proceedings of the fifth ACM conference on Digital libraries. 195-204.

Steffen Rendle. 2010. Factorization machines. In 2010 IEEE International Conference on Data Mining. IEEE, 995-1000.

Steffen Rendle. 2012. Factorization machines with libfm. ACM Transactions on Intelligent Systems and Technology (TIST) 3, 3 (2012), 1-22.

Badrul Sarwar, George Karypis, Joseph Konstan, and John Riedl. 2001. Item-based collaborative filtering recommendation algorithms. In Proceedings of the 10th international conference on World Wide Web. 285-295.

John Schulman, Philipp Moritz, Sergey Levine, Michael Jordan, and Pieter Abbeel. 2015. High-dimensional continuous control using generalized advantage estimation. arXiv preprint arXiv:1506.02438 (2015).

Hinrich Schütze, Christopher D Manning, and Prabhakar Raghavan. 2008. Introduction to information retrieval. Vol. 39. Cambridge University Press Cambridge.

Guy Shani, David Heckerman, Ronen I Brafman, and Craig Boutilier. 2005. An MDP-based recommender system. Journal of Machine Learning Research 6, 9 (2005).

Yue Shi, Alexandros Karatzoglou, Linas Baltrunas, Martha Larson, Alan Hanjalic, and Nuria Oliver. 2012. Tfmap: optimizing map for top-n context-aware recommendation. In Proceedings of the 35th international ACM SIGIR conference on Research and development in information retrieval. 155-164.

Xiaoyuan Su and Taghi M Khoshgoftaar. 2009. A survey of collaborative filtering techniques. Advances in artificial intelligence 2009 (2009).

Richard S Sutton and Andrew G Barto. 2018. Reinforcement learning: An introduction. MIT press.

Nima Taghipour and Ahmad Kardan. 2008. A hybrid web recommender system based on q-learning. In Proceedings of the 2008 ACM symposium on Applied computing. 1164-1168.

Huazheng Wang, Qingyun Wu, and Hongning Wang. 2016. Learning hidden features for contextual bandits. In Proceedings of the 25th ACM International on Conference on Information and Knowledge Management. 1633-1642.

Jun Wang, Arjen P De Vries, and Marcel JT Reinders. 2006. Unifying userbased and item-based collaborative filtering approaches by similarity fusion. In Proceedings of the 29th annual international ACM SIGIR conference on Research and development in information retrieval. 501-508.

Pengfei Wang, Yu Fan, Long Xia, Wayne Zhao, Shaozhang Niu, and Jimmy Huang. 2020. KERL: A Knowledge-Guided Reinforcement Learning Model for Sequential Recommendation. 209-218. https://doi.org/10.1145/3397271.3401134.

Xinxi Wang, Yi Wang, David Hsu, and Ye Wang. 2014. Exploration in interactive personalized music recommendation: a reinforcement learning approach. ACM Transactions on Multimedia Computing, Communications, and Applications (TOMM) 11, 1 (2014), 1-22.

YiningWang, LiweiWang, Yuanzhi Li, Di He, and Tie-Yan Liu. 2013. A theoretical analysis of NDCG type ranking measures. In Conference on Learning Theory. 25-54.

Shuai Zhang, Lina Yao, Aixin Sun, and Yi Tay. 2019. Deep Learning Based Recommender System: A Survey and New Perspectives. ACM Comput. Surv. 52, 1, Article 5 (Feb. 2019), 38 pages.

Weinan Zhang, Tianqi Chen, Jun Wang, and Yong Yu. 2013. Optimizing top-n collaborative filtering via dynamic negative item sampling. In Proceedings of the 36th international ACM SIGIR conference on Research and development in information retrieval. 785-788.

Xiangyu Zhao, Long Xia, Liang Zhang, Zhuoye Ding, Dawei Yin, and Jiliang Tang. 2018. Deep Reinforcement Learning for Pagewise Recommendations. RecSys (2018).

Xiangyu Zhao, Liang Zhang, Zhuoye Ding, Long Xia, Jiliang Tang, and Dawei Yin. 2018. Recommendations with negative feedback via pairwise deep reinforcement learning. In Proceedings of the 24th ACM SIGKDD International Conference on Knowledge Discovery & Data Mining. 1040-1048.

Guanjie Zheng, Fuzheng Zhang, Zihan Zheng, Yang Xiang, Nicholas Yuan, Xing Xie, and Zhenhui Li. 2018. DRN: A Deep Reinforcement Learning Framework for News Recommendation. WWW '18: Proceedings of the 2018 World Wide Web Conference, 167-176.

Office Action as received in Chinese Application No. 202210700134.9 dated Dec. 24, 2025.

* cited by examiner

| Models | Negative feedback | Items relation |
|---|---|---|
| Ours (-N)(-F) | No | No |
| Ours (+N)(-F) | Yes | No |
| Ours (+N)(+F)(d) | Yes | Yes |

*Fig. 6*

| Dataset | # of users | # of items | # of interactions |
|---|---|---|---|
| PI | 1,047,428 | 65,451 | 23,515,109 |
| MovieLens 1M | 6,040 | 3,669 | 1,000,209 |
| CDs and Vinyl | 1,578,597 | 232,376 | 3,749,004 |

*Fig. 7A*

| Dataset | # of users | # of items | # of interactions |
|---|---|---|---|
| Adobe | 4,057 | 200 | 959,942 |
| MovieLens 1M | 4,296 | 200 | 414,893 |
| CDs and Vinyl | 2,655 | 200 | 146,474 |

*Fig. 7B*

| Dataset | Adobe | | | | | Movielens | | | | | CDs and Vinyl(Amazon) | | | | |
|---|---|---|---|---|---|---|---|---|---|---|---|---|---|---|---|
| Metrics(@10K(%)) | Precision | Recall | F1-score | MAP | NDCG | Precision | Recall | F1-score | MAP | NDCG | Precision | Recall | F1-score | MAP | NDCG |
| FM | 0.26197 | 0.16861 | 0.17469 | 0.099564 | 0.26771 | 0.82723 | 0.39112 | 0.48486 | 0.38623 | 0.55281 | 0.92496 | 0.56799 | 0.66059 | 0.57248 | 0.93324 |
| DeepFM | 0.26098 | 0.15969 | 0.17347 | 0.099286 | 0.26931 | 0.82716 | 0.39122 | 0.4851 | 0.39798 | 0.833 | 0.92463 | 0.56642 | 0.65974 | 0.57226 | 0.93293 |
| xDeepFM | 0.25434 | 0.16629 | 0.16899 | 0.09141 | 0.26818 | 0.827164 | 0.39174 | 0.48535 | 0.38723 | 0.83287 | 0.92487 | 0.56645 | 0.65994 | 0.57138 | 0.93123 |
| WDL | 0.25525 | 0.15676 | 0.16967 | 0.099266 | 0.289 | 0.826669 | 0.39144 | 0.48508 | 0.3884 | 0.83465 | 0.92486 | 0.5669 | 0.65999 | 0.57167 | 0.93251 |
| MLR | 0.25088 | 0.15942 | 0.16543 | 0.099657 | 0.26244 | 0.83042 | 0.39203 | 0.48629 | 0.3884 | 0.83463 | 0.92474 | 0.56679 | 0.66085 | 0.57273 | 0.93886 |
| Ours (-N)(-F) | 0.41113 | 0.2863 | 0.29656 | 0.0828 | 0.44896 | 0.72029 | 0.35875 | 0.44046 | 0.35274 | 0.7023 | 0.91802 | 0.6078 | 0.66851 | 0.60275 | 0.92741 |
| Ours (+N)(-F) | 0.40992 | 0.29998 | 0.300986 | 0.08840 | 0.44155 | 0.76032 | 0.3728 | 0.45997 | 0.364066 | 0.74939 | 0.91497 | 0.66936 | 0.65399 | 0.59977 | 0.92368 |
| Ours (-N)(+F)(3) | 0.63733 | 0.44572 | 0.46152 | 0.1584 | 0.71264 | 0.84335 | 0.39918 | 0.49491 | 0.39366 | 0.84771 | 0.92333 | 0.69925 | 0.66827 | 0.60694 | 0.93822 |
| Ours (-N)(+F)(5) | 0.6465 | 0.45511 | 0.46572 | 0.159968 | 0.71648 | 0.85301 | 0.40552 | 0.50174 | 0.4683 | 0.85678 | 0.92542 | 0.61196 | 0.69121 | 0.61111 | 0.93796 |

*Fig. 8A*

| Dataset | Adobe | | | | | Movielens | | | | | CDs and Vinyl(Amazon) | | | | |
|---|---|---|---|---|---|---|---|---|---|---|---|---|---|---|---|
| Metrics(@10K(%)) | Precision | Recall | F1-score | MAP | NDCG | Precision | Recall | F1-score | MAP | NDCG | Precision | Recall | F1-score | MAP | NDCG |
| LinUCB | 0.0165 | 0.0757 | 0.0241 | 0.0004 | 0.0419 | 0.0546 | 0.0162 | 0.0238 | 0.0006 | 0.0546 | 0.0765 | 0.0207 | 0.0309 | 0.0006 | 0.0546 |
| HLinUCB | 0.0855 | 0.0103 | 0.006 | 0.0001 | 0.0065 | 0.0674 | 0.0274 | 0.0373 | 0.0011 | 0.0674 | 0.0269 | 0.0089 | 0.0135 | 0.0005 | 0.0396 |
| Ours (+N)(+F)(3) | 0.099 | 0.0763 | 0.0735 | 0.0531 | 0.1173 | 0.8924 | 0.2429 | 0.359 | 0.6211 | 0.8823 | 0.9217 | 0.1902 | 0.2799 | 0.8639 | 0.9139 |
| Ours (+N)(+F)(5) | 0.1803 | 0.0775 | 0.0743 | 0.0548 | 0.12 | 0.9007 | 0.2446 | 0.3617 | 0.8573 | 0.894 | 0.936 | 0.1922 | 0.2891 | 0.88219 | 0.9141 |

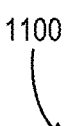

Generating Item Embeddings That Encode Interactions With A Plurality Of Digital Content Items *1102*

Generating Collaborative-Filtering-Item Embeddings *1104*

Generating Graph Embeddings *1106*

Monitoring User Interactions With One Or More Digital Content Items *1108*

Determining Interaction Maps From The User Interactions Utilizing The Item Embeddings *1110*

Generating A Negative Interaction Map Utilizing Negative Item Embeddings *1112*

Generating A Positive Interaction Map Utilizing Positive Item Embeddings *1114*

Determining Additional Digital Content Items To Provide For Display *1116*

*Fig. 11*

GENERATING DIGITAL RECOMMENDATIONS UTILIZING COLLABORATIVE FILTERING, REINFORCEMENT LEARNING, AND INCLUSIVE SETS OF NEGATIVE FEEDBACK

BACKGROUND

Recent years have seen significant advancement in hardware and software platforms that generate and provide digital recommendations to computing devices. For example, many conventional systems recommend digital content items to computing devices based on user preferences associated with the computing device and/or similarities between attributes associated with the computing device and attributes associated with one or more other computing devices (e.g., similarities between the attributes of their respective users). Although conventional systems can generate targeted recommendations, such systems often fail to flexibly account for the relationships between digital content items and/or accommodate dynamic user preferences/features, leading to inaccurate digital recommendations and inefficient utilization of computer resources.

These, along with additional problems and issues exist with regard to conventional recommendation systems.

SUMMARY

One or more embodiments described herein provide benefits and/or solve one or more of the foregoing or other problems in the art with systems, methods, and non-transitory computer-readable media that flexibly generate accurate digital recommendations for dynamic features corresponding to client devices utilizing collaborative filtering and reinforcement learning. In particular, in one or more embodiments, the disclosed systems implement a reinforcement learning model having an actor-critic framework to capture dynamic changes in client device and user features or interests. Further, the disclosed systems utilize the relationships between digital content items (e.g., determined via collaborative filtering) when generating digital recommendations. For example, in one or more embodiments, the disclosed systems integrate the digital content item relationships into the historical interactions of client devices with the digital content items to represent associated features and preferences. In some implementations, the disclosed systems utilize the entirety of positive and negative interactions observed from a client device to determine the features/preferences associated with the client device. Thus, the disclosed systems flexibly determine the changes in features and integrate item relationships to generate digital recommendations that more accurately reflect features associated with client devices. Further, the disclosed systems utilize a neighborhood search approach within an embedding space that encodes the item relationships when selecting items for recommendation to operate with more efficiency in large search spaces.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 6 illustrates a table of various embodiments of the sequential recommender system utilized for determining the effectiveness of the sequential recommender system in accordance with one or more embodiments;

FIGS. 7A-7B illustrate tables reflecting data used in determining the effectiveness of the sequential recommender system in accordance with one or more embodiments;

FIGS. 8A-8B illustrate tables reflecting experimental results regarding the effectiveness of the sequential recommender system in accordance with one or more embodiments;

FIG. 11 illustrates a flowchart of a series of acts for determining one or more digital content items to provide to a client device in accordance with one or more embodiments.

DETAILED DESCRIPTION

Figure 1:
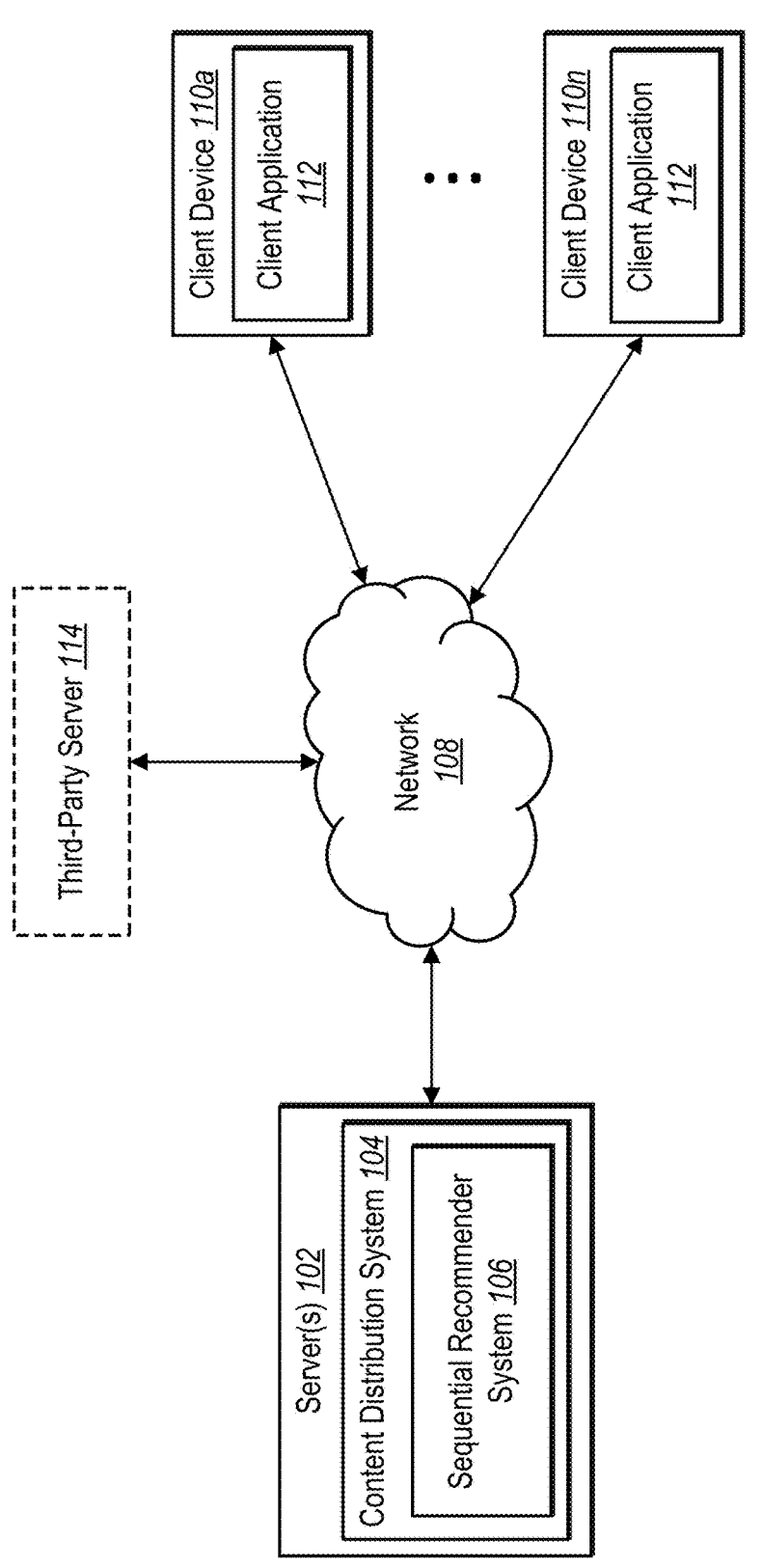
FIG. 1 illustrates an example environment in which a sequential recommender system operates in accordance with one or more embodiments.

One or more embodiments described herein include a sequential recommender system that utilizes reinforcement learning and collaborative filtering to generate flexible and accurate digital content item recommendations. For example, in one or more embodiments, the sequential recommender system implements a deep reinforcement learning recommendation framework with an actor-critic paradigm that considers the recommendation problem as a sequential decision-making process to adapt to client device behaviors and maximize long-term rewards. Indeed, in some embodiments, the sequential recommender system continually optimizes the experience of a client device using real-time learning via this framework to determine client device/user features on the fly and offer trending items associated with those features. Further, in some instances, the sequential recommender system incorporates relationships between digital content items (e.g., determined via collaborative filtering) into the reinforcement learning model. Moreover, in some cases, where a client device interacts negatively with digital content items, the sequential recommender system utilizes all negative interactions in generating a recommendation to more fully utilize available indicators.

To provide an illustration, in one or more embodiments, the sequential recommender system generates, for a plurality of digital content items, a set of item embeddings (e.g., using a collaborative filtering model) that encode interactions across client devices associated with the plurality of digital content items. Additionally, the sequential recommender system monitors user interactions of a client device with one or more digital content items from the plurality of digital content items during an interaction session. Utilizing the set of item embeddings, the sequential recommender system determines a negative interaction map and a positive interaction map. The sequential recommender system further determines, utilizing a reinforcement learning model, one or more additional digital content items from the plurality of digital content items to provide for display based on the set of item embeddings, the negative interaction map, and the positive interaction map.

As just mentioned, in one or more embodiments, the sequential recommender system generates item embeddings for a plurality of digital content items using a collaborative filtering model (or a graph embedding model). In particular, the sequential recommender system generates the item embeddings to capture the relationships among the digital content items. In one or more embodiments, the sequential recommender system encodes these relationships within the item embeddings based on previous interactions of multiple client devices with the digital content items. Thus, the item embeddings represent the tendency of similar client devices (e.g., users of the client devices having similarities) to prefer similar digital content items. In some implementations, the item embeddings include collaborative-filtering item embeddings, graph embeddings, or other embeddings that encode item relationships.

As further mentioned above, in some embodiments, the sequential recommender system monitors user interactions with one or more digital content items during an interaction session. For example, the sequential recommender system monitors responses of the client device as the digital content items are displayed on the client device. Indeed, the sequential recommender system observes positive interactions (e.g., clicks, purchases, high ratings, etc.) and/or negative interactions (e.g., neglect, low ratings, etc.) with digital content items.

In some implementations, the sequential recommender system generates positive and negative interaction maps based on the user interactions. For example, in some cases, the sequential recommender system generates a positive interaction map based on any observed positive interactions and a negative interaction map based on any observed negative interactions. In one or more embodiments, the sequential recommender system generates the negative interaction map and/or positive interaction maps using all observed negative interactions (i.e., without sampling a subset). In some cases, the sequential recommender system generates the interactions maps using the item embeddings corresponding to the digital content items with which the client device interacted.

In one or more implementations, the sequential recommender system further generates the positive and negative interaction maps using item embeddings of other digital content items. For instance, the sequential recommender system establishes a set number of digital content items to be represented in the positive and negative interaction maps, and the number of observed positive and/or negative interactions is less than the set number. Accordingly, for an interaction map including less than the set number of digital content item representations solely based the digital content items with which the client device interacted, the sequential recommender system includes the item embeddings of other digital content items.

For example, the sequential recommender system can fill the positive interaction map with digital content items that are near to observed positive interactions within an embedding space (or far from negative interactions within the embedding space). Similarly, the sequential recommender system can fill the negative interaction maps with digital content items that are near to observed negative interactions within an embedding space (or far from positive interactions within the embedding space). Thus, the sequential recommender system incorporates item relationships when generating recommendations.

Additionally, as mentioned above, in one or more embodiments, the sequential recommender system utilizes a reinforcement learning model to determine one or more digital items to provide for display on the client device (i.e., generate a recommendation). For example, in some cases, the sequential recommender system utilizes a reinforcement learning model having an actor model and a critic model.

To illustrate, in some implementations, the actor model includes multiple convolutional gated recurrent unit neural network layers. The sequential recommender system uses one convolutional gated recurrent unit neural network layer to generate a positive state for the client device based on the positive interaction map and uses another convolutional gated recurrent unit neural network layer to generate a negative state for the client device based on the negative interaction map. In some instances, the sequential recommender system further generates the positive and negative states based on previous positive and negative states, respectively, of the client device. Thus, the sequential recommender system incorporates past user interactions of the client device (e.g., interaction sequences across different time intervals) when generating a recommendation.

Further, in some embodiments, the sequential recommender system utilizes the actor model to generate a recommendation for the client device using the positive and negative states. In particular, the sequential recommender system uses the actor model to determine one or more additional digital content items to provide for display to the client device. In some instances, the sequential recommender system further uses the item embeddings to determine the additional digital content item(s) (e.g., by identifying digital content items that are similar to those with which the client device has interacted positively or dissimilar to those with which the client device has interacted negatively).

In some cases, the sequential recommender system uses the critic model to evaluate the quality of the recommendation generated using the actor model—such as by generating a value function. In some instances, the sequential recommender system modifies the parameters of the actor model using the quality function of the critic model. In some implementations, the critic model includes a unique architecture of network layers to process positive and negative state-action vectors in determining and applying a value function.

As mentioned above, conventional recommendation systems suffer from several technological shortcomings that result in inflexible, inaccurate, and inefficient operation. For example, many conventional recommendation systems implement static models—such as collaborative filtering models, content-based filtering models, matrix factorization models, factorization machine models, or deep learning models—in leveraging item relations to generate recommendations. However, such models typically operate using an unchanging set of user features/preferences, failing to accommodate evolving trends and preference dynamics. These models also tend to make recommendations that maximize the immediate reward, failing to optimize for the long-term cumulative reward. Some conventional systems attempt to overcome these issues by implementing a reinforcement learning model that accommodates changing user features/preferences and makes recommendations to optimize the long-term reward. These conventional systems, however, often fail to generate recommendations that reflect relationships between items.

In additional to flexibility concerns, conventional recommendation systems are often inaccurate in capturing user preferences/features within their recommendations. Indeed, as discussed above, conventional systems often implement models that either neglect the dynamics of client device features or neglect the relationships between items (or both). Accordingly, these conventional systems typically provide, to a client device, recommended items based on an inaccurate perception of how those items fit the current preferences/features of the client device. For instance, those conventional systems that implement static models must be retrained from scratch to incorporate any changed features, causing a significant lag between training and deployment that fails to capture the most current features. Further, conventional systems often ignore significant portions of interaction data when generating recommendations. For example, many conventional systems generate recommendations for some items based on previous interactions with other items. In doing so, however, many conventional systems generally focus on previous positive interactions, utilizing only a sampled subset of negative interactions (to avoid data bias toward numerous negative interactions) or ignoring the previous negative interactions entirely. By neglecting such interaction data, conventional systems fail to use all available feature indicators to accurately determine the current features associated with a client device and make recommendations appropriate for those features/preferences.

Further conventional recommendation systems suffer from inefficiencies. For example, environments in which recommendations are provided are often associated with numerous available items. Accordingly, the state and action spaces for these environments are very large. Many conventional systems, such as those utilizing reinforcement learning models, face a significant number of computational challenges due to the size of these spaces, making deployment impractical. Indeed, conventional systems cannot scale to meet the computational demands of increasingly complex real-world environments, resulting in excessive and inefficient use of computer resources.

The sequential recommender system provides several advantages over conventional systems. For example, the sequential recommender system can operate more flexibly than conventional systems. Indeed, by utilizing both item embeddings (e.g., generated via collaborative filtering) and reinforcement learning, the sequential recommender system can flexibly accommodate both the relationships between digital content items and dynamic features when generating recommendations.

Additionally, the sequential recommender system can operate more accurately than conventional systems. For instance, by incorporating both digital content item relationships (via collaborative filtering) and dynamic user/client device features (via reinforcement learning) into the recommendation process, the sequential recommender system more accurately determines how particular digital content items satisfy current features/preferences associated with a client device. Further, by incorporating all negative feedback and continuously learning in real-time via reinforcement learning, the sequential recommender system can more accurately determine those current features. Thus, the sequential recommender system can generate recommendations that more accurately reflect client device features and preferences.

Further, the sequential recommender system can operate with improved efficiency when compared to conventional systems. For example, the sequential recommender system can narrow the search space used for identifying additional content items to recommend by incorporating item embeddings that encode relationships between the digital content items. Though the search space remains too large for many conventional systems, the actor-critic implementation of the sequential recommender system can navigate this space practically using a neighborhood search strategy rather than looking at every possible permutation when recommending multiple digital content items. Further, the sequential recommender system can leverage the approximating nature of neural network components, such as the convolutional gated recurrent unit neural network layers to avoid extensive computation. Additionally, under the reinforcement learning framework, the sequential recommender system need not estimate the transition probability or store a value function table as if often done. Furthermore, in light of the improved accuracy discussed above, the sequential recommender system can avoid wasted bandwidth and resources in distributing unnecessary digital content/digital recommendation to client devices. Thus, the sequential recommender system preserves a significant amount of computing resources typically used by conventional systems, allowing for practical deployment in real-world environments associated with large state and action spaces.

Additional detail regarding the sequential recommender system will now be provided with reference to the figures. For example, FIG. 1 illustrates a schematic diagram of an exemplary system environment ("environment") 100 in which a sequential recommender system 106 can be implemented. As illustrated, in FIG. 1, the environment 100 includes a server(s) 102, a network 108, client devices 110a-110n, and a third-party server 114.

Although the environment 100 of FIG. 1 is depicted as having a particular number of components, the environment 100 can have any number of additional or alternative components (e.g., a different number of servers, client devices, third-party systems, or other components in communication with the sequential recommender system 106 via the network 108). Similarly, although FIG. 1 illustrates a particular arrangement of the server(s) 102, the network 108, the client devices 110a-110n, and the third-party server 114, various additional arrangements are possible.

The server(s) 102, the network, 108, the client devices 110a-110n, and the third-party server 114 may be communicatively coupled with each other either directly or indirectly (e.g., through the network 108 as discussed in greater detail below in relation to FIG. 12). Moreover, the server(s) 102, the client devices 110*a*-110*n*, and the third-party server 114 may include a variety of computing devices (including one or more computing devices as discussed in greater detail with relation to FIG. 12).

As mentioned above, the environment 100 includes the server(s) 102. In one or more embodiments, the server(s) 102 generates, stores, receives, and/or transmits digital data, including digital data related to digital content items provided to a client device. To provide an illustration, in some instances, the server(s) 102 receives, from a client device (e.g., one of the client devices 110*a*-110*n*) user interactions with one or more digital content items and provides one or more digital content items for display on the client device in return. In some implementations, the server(s) 102 receives the user interactions from and/or provides the additional digital content items to a third-party system (e.g., hosted on the third-party server 114). In one or more embodiments, the server(s) 102 comprises a data server. In some embodiments, the server(s) 102 comprises a communication server or a web-hosting server.

As shown in FIG. 1, the server(s) 102 includes a content distribution system 104. In one or more embodiments, the content distribution system 104 manages the distribution of digital content to client devices. For example, in some instances, the content distribution system 104 distributes digital content items to client devices. In some implementations, the content distribution system 104 provides a recommendation (e.g., to a third-party system hosted on the third-party server 114) for the distribution of certain digital content items.

Additionally, the server(s) 102 includes the sequential recommender system 106. In particular, in one or more embodiments, the sequential recommender system 106 determines digital content items to be provided for display on client devices. For example, in some instances, the sequential recommender system 106 utilizes the server(s) 102 to determine one or more digital content items to provide to a client device based on prior user interactions of the client device with one or more other digital content items.

To illustrate, in one or more embodiments, the sequential recommender system 106, via the server(s) 102, generates a set of item embeddings for a plurality of digital content items using a collaborative filtering model (or a graph embedding model). In particular, the set of item embeddings encode interactions across client devices associated with the plurality of digital content items. Additionally, via the server(s) 102, the sequential recommender system 106 monitors user interactions of a client device with one or more digital content items from the plurality of digital content items during an interaction session. Via the server(s) 102, the sequential recommender system 106 determines a negative interaction map and a positive interaction map from each user interaction of the interaction session (e.g., each negative interaction and/or positive interaction) utilizing the set of item embedding vectors. Utilizing a reinforcement learning model, the sequential recommender system 106, via the server(s) 102, determines one or more additional digital content items from the plurality of digital content items to provide for display based on the set of item embeddings, the negative interaction map, and the positive interaction map.

In one or more embodiments, the third-party server 114 interacts with the sequential recommender system 106, via the server(s) 102, over the network 108. For example, in some implementations, the third-party server 114 hosts a third-party system that receives recommendations from the sequential recommender system 106 for providing digital content items for display on client devices. In some implementations, the third-party server 114 receives the digital content items themselves to provide to the client devices. In some cases, the third-party system hosted on the third-party server 114 monitors the user interactions of the client devices and provides the observed user interactions to the sequential recommender system for generation of a recommendation.

In one or more embodiments, the client devices 110*a*-110*n* include computing devices that are capable of displaying and/or interacting with digital content items. For example, in some implementations, the client devices 110*a*-110*n* include at least one of a smartphone, a tablet, a desktop computer, a laptop computer, a head-mounted-display device, or other electronic device. In some instances, the client devices 110*a*-110*n* include one or more applications (e.g., the client application 112) that are capable of displaying and/or interacting with digital content items. For example, in some embodiments, the client application 112 includes a software application installed on the client devices 110*a*-110*n*. In other cases, however, the client application 112 includes a web browser or other application that accesses a software application hosted on the server(s) 102.

The sequential recommender system 106 can be implemented in whole, or in part, by the individual elements of the environment 100. Indeed, although FIG. 1 illustrates the sequential recommender system 106 implemented with regard to the server(s) 102, different components of the sequential recommender system 106 can be implemented by a variety of devices within the environment 100. For example, one or more (or all) components of the sequential recommender system 106 can be implemented by a different computing device (e.g., one of the client devices 110*a*-110*n*) or a separate server from the server(s) 102 hosting the content distribution system 104. Example components of the sequential recommender system 106 will be described below with regard to FIG. 10.

Figure 2:
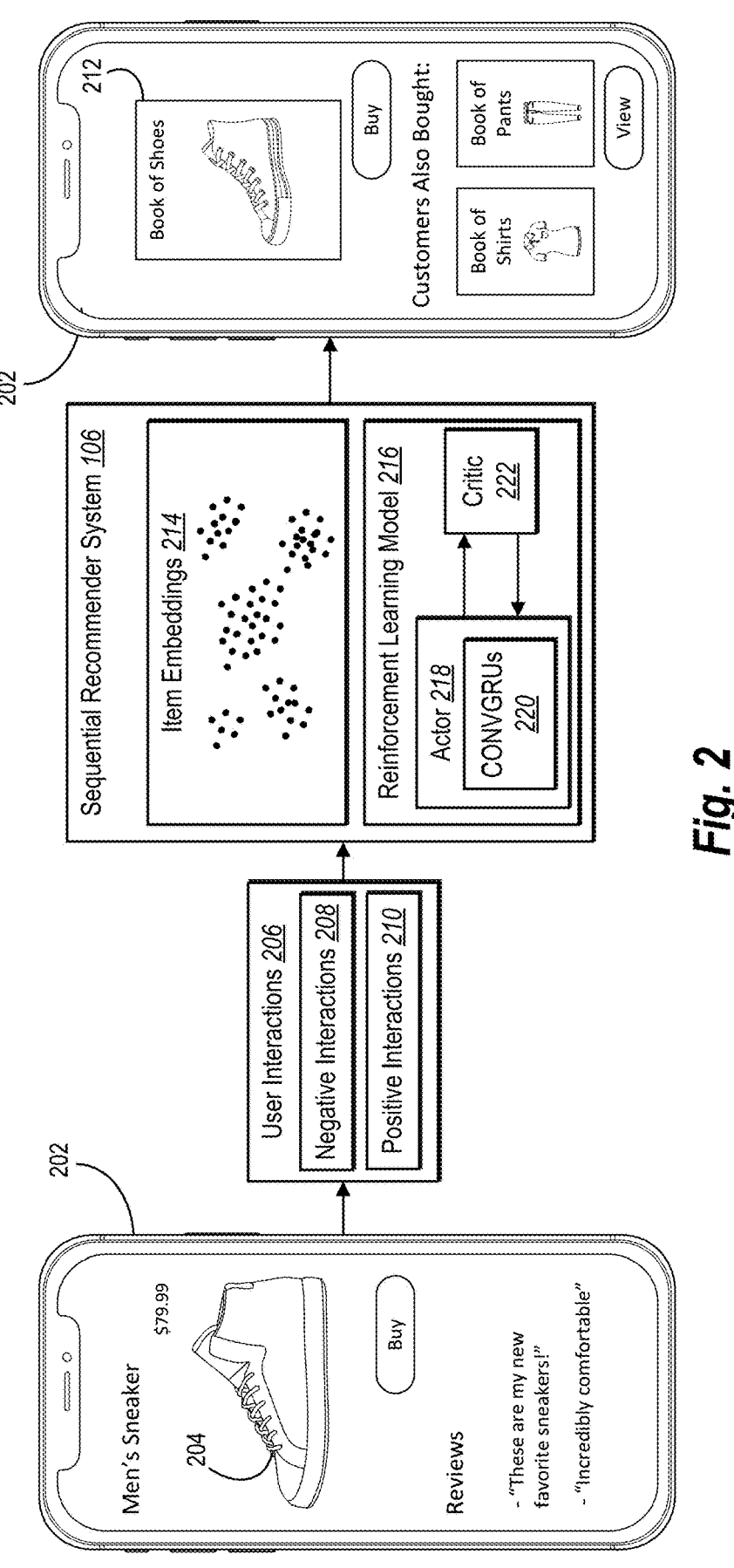
FIG. 2 illustrates an overview diagram of the sequential recommender system generating a recommendation in accordance with one or more embodiments.

As mentioned above, the sequential recommender system 106 recommends digital content items to a client device. In particular, the sequential recommender system 106 determines one or more digital content items to provide for display on a client device. FIG. 2 illustrates an overview diagram of the sequential recommender system 106 determining one or more digital content items to provide for display in accordance with one or more embodiments.

As shown in FIG. 2, one or more digital content items, such as the digital content item 204, are displayed on a client device 202. For example, in one or more embodiments, the sequential recommender system 106 provides the one or more digital content items for display on the client device 202.

In one or more embodiments, a digital content item includes digital content that can be transmitted to a computing device, such as via a network. In some embodiments, a digital content item includes digital content associated with a product (e.g., a digital product or a real-world product) or a service. To illustrate, in some cases, a digital content item includes a description of the product or service (e.g., within a webpage, a digital document, or an electronic message—such as a text, email message, or social media post) and/or a digital video or image showcasing the product or service. In some implementations, a digital content item provides a selectable option for purchasing or making an inquiry regarding the product or service. In some embodiments, a digital content item includes a link (e.g., within an electronic message) for accessing the product or service or for accessing additional digital content associated with the product or service.

Additionally, as shown in FIG. 2, the sequential recommender system 106 monitors user interactions 206 of the client device 202 with the one or more digital content items (e.g., with the digital content item 204). For example, as shown, the sequential recommender system 106 monitors (e.g., observes) negative interactions 208 and positive interactions 210.

In one or more embodiments, a user interaction (also more succinctly referred to as an interaction) includes a response of a client device to a digital content item. For example, in some cases, a user interaction includes an action of a client device as a digital content item is displayed on the client device. To illustrate, in some instances, a user interaction includes an action of viewing or not viewing a digital content item. For example, a user interaction can include viewing a digital content item (e.g., viewing an included digital video or maintaining the digital content item on display via the client device) scrolling away from the digital content item or otherwise removing the digital content item from display on the client device. In some cases, a user interaction includes a click (e.g., clicking on a link included in the digital content item), submission of an inquiry, a purchase, providing a comment, or submitting a rating for the digital content item (e.g., for the product or service portrayed in the digital content item).

In one or more embodiments, a positive interaction includes a user interaction that indicates interest in a digital content item (e.g., interest in the portrayed product or service). For example, in some instances, a positive interaction includes a click, a purchase, submission of an inquiry, submitting a favorable rating, or viewing the digital content item (e.g., for longer than a threshold). Likewise, in one or more embodiments, a negative interaction includes a user interaction that indicates disinterest in a digital content item. For example, in some cases, a negative interaction includes submission of a low rating or scrolling away from or otherwise removing a digital content item from display on the client device. In one or more embodiments, the sequential recommender system 106 establishes the characteristics of positive interactions and negative interactions (e.g., based on user input). For example, for a rating scale, the sequential recommender system 106 establishes a threshold rating value that differentiates between a positive interaction and a negative interaction utilizing user input in some embodiments.

It should be noted that FIG. 2 shows the user interactions 206 including the negative interactions 208 and the positive interactions 210 for illustration purposes. In some instances, user interactions include only negative interactions (e.g., the sequential recommender system 106 observes negative interactions but no positive interactions). In other cases, user interactions include only positive interactions (e.g., the sequential recommender system 106 observes positive interactions but no negative interactions). Further, FIG. 2 illustrates the user interactions 206 including multiple negative interactions and multiple positive interactions; however, it should be noted that user interactions include a single negative interaction and/or a single positive interaction in some cases.

Indeed, in one or more embodiments, the sequential recommender system 106 monitors the user interactions 206 during an interaction session. In one or more embodiments, an interaction session includes a distinct period in which a client device interacts with one or more digital content items. In some cases, an interaction session includes a set period of time or a set number of interactions. In some implementations, an interaction session concludes with a positive interaction and includes all negative interactions occurring immediately before the positive interaction. In some cases, an interaction session includes a period in which a client device browses a website, a plurality of websites, a social network feed, or other medium in which digital content items are provided.

As shown in FIG. 2, the sequential recommender system 106 utilizes the user interactions 206 with the one or more digital content items (e.g., including the digital content item 204) to generate a recommendation for the client device 202. In particular, the sequential recommender system 106 utilizes the negative interactions and the positive interactions 210 to determine one or more additional digital content items for the client device. As further shown, the sequential recommender system 106 provides the one or more additional digital content items (e.g., the digital content item 212 or the other digital content items shown) for display via the client device. In one or more embodiments, the sequential recommender system 106 provides the one or more additional digital content items during a subsequent interaction session.

As illustrated in FIG. 2, to generate the recommendation for the client device 202, the sequential recommender system 106 further utilizes item embeddings 214 generated using a collaborative filtering model (or a graph embedding model). In one or more embodiments, the item embeddings 214 correspond to a plurality of digital content items, including the one or more digital content items with which the client device 202 interacted during the interaction session. For example, in some cases, the item embeddings 214 correspond to the entirety or a portion of the available products and/or services offered by a provider. More detail regarding item embeddings will be discussed below with reference to FIG. 3.

As further illustrated, the sequential recommender system 106 utilizes a reinforcement learning model 216 to generate the recommendation for the client device 202. As shown, the reinforcement learning model 216 includes an actor model 218 having convolutional gated recurrent unit neural network layers 220 and a critic model 222. In one or more embodiments, the sequential recommender system 106 utilizes the actor model 218 to recommend digital content items and utilizes the critic model 222 to evaluate the recommendation. More detail regarding the reinforcement learning model 216 will be provided below with reference to FIGS. 5A-5B. Detail regarding the overall approach in generating recommendations (e.g., determining digital content items to provide for display) in accordance with one or more embodiments will now be provided.

Indeed, in one or more embodiments, the sequential recommender system 106 models recommendation generation as a Markov Decision Process (MDP) $\mathcal{M}$ where the sequential recommender system 106 (i.e., the agent) interacts with client devices (i.e., the environment) over a sequence of time steps by recommending n digital content items in each time step (e.g., each interaction session) where n>=1. In some cases, the sequential recommender system 106 defines $\mathcal{M}$ as a tuple of five elements (S, A, T, R, γ).

In one or more embodiments, the sequential recommender system 106 defines the state space $S: s_t \epsilon S$ as features or attributes associated with a client device at time $t_i$. For instance, in one or more embodiments, the state space includes user features/preferences associated with a client device at time $t_i$. In one or more embodiments, the sequential recommender system 106 determines the features/preferences associated with a client device based on the historical interactions of that client device. Thus, for example, the sequential recommender system 106 determines the user preferences of a client device to be a function of the client device's interaction history $h_i$, where $s_i = f(h_i)$. The state space, however, can include other features or attributes associated with a client device, such as the location associated with a client device, technical specifications of the client device, browsing history associated with the client device, etc.

As will be explained in more detail below, in one or more embodiments, the sequential recommender system 106 separates the state $s_i$ of a client device into a positive state $s_i^+$ and a negative state $s_i^-$. Accordingly, the sequential recommender system 106 separates the interaction history of a client device into a positive interaction history $h_i^+$ and a negative interaction history $h_i^-$ so that $s_i^+ = f(h_i^+)$ and $s_i^- = f(h_i^-)$. Further, in one or more embodiments, the sequential recommender system 106 defines the historical interactions as $h_i^+ = \{I_{set_1}^+, I_{set_2}^+, \ldots, I_{set_{i-1}}^+\}$ and $h_i^- = \{I_{set_1}^-, I_{set_2}^-, \ldots, I_{set_{i-1}}^-\}$ where $I_{set_i}^+$ and $I_{set_i}^-$ and represent corresponding positive and negative sets (i.e., positive and negative interaction maps) generated based on the user interactions of the client device with digital content items during interaction session $t_i$ (which can include interactions with recommended digital content items during that interaction session).

In some embodiments, the sequential recommender system 106 defines the action space A: $a_i \in A$ as n recommended digital content items. For example, in some implementations, the sequential recommender system 106 determines a vector representation (e.g., an action vector) of the n digital content items provided for display via a client device.

In one or more instances, the sequential recommender system 106 defines the reward $R: r_1 \in R$ as the immediate reward received based on a client device's response to recommended digital content items $$r((s_i^+, s_i^-), a_i).$$

In other words, the sequential recommender system 106 determines the reward based on the user interactions of a client device with one or more recommended digital content items.

In some implementations, the sequential recommender system 106 denotes the transition function T as the as the probability of state transition from $$s_i = (s_i^+, s_i^-) \text{ to } s_{i+1} = (s_{i+1}^+, s_{i+1}^-)$$

after the action $a_i$. Indeed, the sequential recommender system 106 denotes $T(s_i, a_i, s_{i+1}) = Pr(s_{i+1}|s_i, a_i)$. In one or more embodiments, the sequential recommender system 106 utilizes the Markov property of the transition function: $Pr(s_{i+1}|s_i, a_i) = Pr(s_{i+1}|s_i, a_i, s_{i-1}, a_{i-1}, \ldots, s1, a_i)$.

In some embodiments, the sequential recommender system 106 utilizes the decay parameter $\gamma: \gamma \in [0,1]$ to determine the importance of future rewards. For example, in some instances where $\gamma = 0$, the sequential recommender system 106 considers only the immediate reward and ignores future rewards. On the other hand, in some cases where $\gamma = 1$, the sequential recommender system 106 weights the immediate rewards and future rewards equally.

In one or more embodiments, the sequential recommender system 106 operates to determine an optimized policy as well as an approximator for a value function that evaluates the actions selected by the policy. Accordingly, in one or more embodiments, the sequential recommender system 106 incorporates an actor-critic framework to combine computing value functions with an explicit representation of the policy. Indeed, in one or more embodiments, through this framework, the sequential recommender system 106 continuously determines the optimal recommendation policy $\pi_\theta: S \rightarrow A$ in order to maximize the expected long-term cumulative rewards from any state-action pairs ($s_i \in S$, $a_i \in A$). In particular, in one or more embodiments, the sequential recommender system 106 operates to optimize the expected long-term cumulative rewards as follows:

$$Q^*(s_i, a_i) = \max_{\pi_\theta} \mathbb{E}_{\pi_\theta} \left\{ \sum_{k=0}^{\infty} \gamma^k r_{t+k}|s_i, a_i \right\} \tag{1}$$

In equation 1, $\mathbb{E}$ represents the expectation under policy $\pi_\theta$ and $r_{t+k}$ represents the immediate reward at the future time step t+k. Further, Q represents a value function (also referred to as a Q-value function) where $Q(s,a) = \mathbb{E}_{s'}[r + \gamma Q(s',a')|s, a]$. As will be discussed below, in one or more embodiments, the sequential recommender system 106 utilizes the actor model of the actor-critic framework to determine the action $a_i$ and utilizes the critic model to generate the value function for the action-state pair ($s_i, a_i$), rather than all potential action-state pairs.

Figure 3:
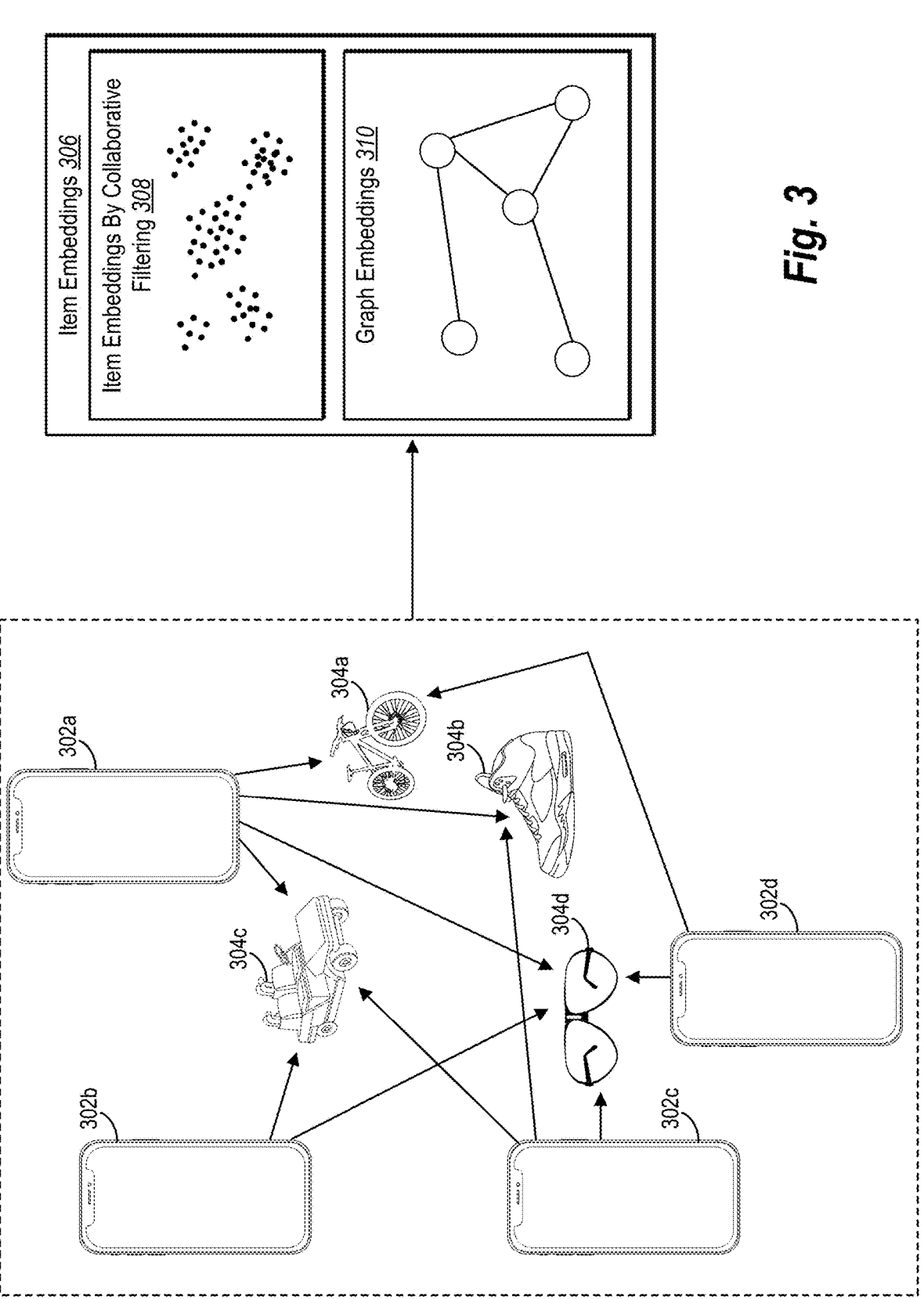
FIG. 3 illustrates a diagram for generating a set of item embeddings for a plurality of digital content items in accordance with one or more embodiments.

As just mentioned, in one or more embodiments, the sequential recommender system 106 utilizes item embeddings to determine digital content items to provide for display via a client device. In some instances, the sequential recommender system 106 generates a set of item embeddings for a plurality of digital content items and utilizes the set of item embeddings to determine the digital content items to provide. FIG. 3 illustrates a diagram for generating a set of item embeddings for a plurality of digital content items in accordance with one or more embodiments.

In one or more embodiments, an item embedding includes a value or set of values that represents a digital content item. In particular, an item embedding includes a value or set of values (e.g., a vector of values) that correspond to attributes and/or characteristics of a digital content item. In some cases, an item embedding further represents the relationships between the corresponding digital content item and one or more other digital content items. In one or more instances, an item embedding represents the relationships based on interactions of a plurality of client devices with the corresponding digital content item and the one or more other digital content items. In some implementations, the sequential recommender system 106 generates an item embedding within an item embedding space.

In one or more embodiments, the sequential recommender system 106 distinguishes between positive item embeddings and negative item embeddings. In some embodiments, a positive item embedding includes an item embedding corresponding to a digital content item for which a client device has a determined interest. For example, in some cases, a positive item embedding includes an item embedding corresponding to a digital content item with which a client device interacted positively or a digital content item for which the client device has a determined interest otherwise.

Likewise, in some cases, a negative item embedding includes an item embedding corresponding to a digital content item for which a client device has a determined disinterest. For example, in some cases, a negative item embedding includes an item embedding corresponding to a digital content item with which a client device interacted negatively or a digital content item for which the client device has a determined disinterest otherwise. Indeed, as the sequential recommender system 106 determines an item embedding to be positive or negative based on the interest or disinterest of a client device, the sequential recommender system 106 determines an item embedding to be a positive item embedding with respect to one client device and a negative item embedding with respect to another client device in some implementations.

Indeed, as shown in FIG. 3, the sequential recommender system 106 monitors the interactions of a plurality of client devices 302a-302d with a plurality of digital content items 304a-304d. In some implementations, the sequential recommender system 106 receives or retrieves the interactions of the client devices 302a-30d from a third-party system. In some cases, the interactions of the client devices 302a-30d include positive interactions and/or negative interactions.

In one or more embodiments, the sequential recommender system 106 utilizes the interactions of the client devices 302a-302d with the digital content items 304a-304d as an indication of the relationships among the digital content items 304a-304d. For example, in some implementations, the interactions of the client devices 302a-302b indicate which digital content items are preferred by client devices having a shared set of attributes or which digital content items are preferred by client devices that also prefer another particular digital content item.

As shown in FIG. 3, the sequential recommender system 106 generates a set of item embeddings 306 utilizing the interactions of the client devices 302a-302d with the digital content items 304a-304d. In particular, as mentioned above, the sequential recommender system 106 generates the item embeddings 306 to encode the relationships among the digital content items 304a-304d by encoding, within the item embeddings 306, the interactions of the client devices 302a-302d with the digital content items 304a-304d.

As illustrated by FIG. 3, in one or more embodiments, the sequential recommender system 106 generates the item embeddings 306 using collaborative filtering. Specifically, the sequential recommender system 106 generates item embeddings by collaborative filtering 308 (or "collaborative-filtering-item embeddings 308") corresponding to the digital content items 304a-304d. Indeed, in one or more embodiments, a collaborative-filtering-item embedding includes an item embedding generated via a collaborative filtering model. In one or more embodiments, a collaborative-filtering-item embedding represents the relationships between the corresponding digital content item and other digital content items within the value or set of values of the collaborative-filtering-item embedding. For example, in one or more embodiments, a collaborative-filtering-item embedding encodes, within its value(s), similarities of the corresponding digital content item and at least one other digital content item based on client device interactions with the corresponding digital content item and the at least one other digital content item. In one or more embodiments, the relationship between digital content items is reflected by the proximity of their corresponding collaborative-filtering-item embeddings within the item embedding space. In some implementations, the sequential recommender system 106 generates item embeddings as described in Badrul Sarwar et al., *Item-based Collaborative Filtering Recommendation Algorithms,* 2001, In Proceedings of the 10th International Conference on World Wide Web, pp. 285-295, which is incorporated herein by reference in its entirety. In some cases, the sequential recommender system 106 generates item embeddings as described in Xiaoyuan Su and Taghi M. Khoshgoftaar, *A Survey of Collaborative Filtering Techniques,* Advances in Artificial Intelligence 2009 (2009), which is incorporated herein by reference in its entirety.

In one or more embodiments, the sequential recommender system 106 generates the collaborative-filtering-item embeddings 308 utilizing a matrix factorization model or a factorization machine model. In some cases, the sequential recommender system 106 generates the collaborative-filtering-item embeddings 308 utilizing a factorization machine neural network, such as a deep factorization machine. As an example of the latter, in one or more embodiments, the sequential recommender system 106 utilizes a deep factorization machine described in Huifeng Guo et al., *DeepFM: A Factorization-machine Based Neural Network for CTR Prediction,* 2017, https://arxiv.org/abs/1703.04247, which is incorporated herein by reference in its entirety.

As further illustrated by FIG. 3, in one or more embodiments, the sequential recommender system 106 generates the item embeddings 306 by generating graph embeddings 310 corresponding to the digital content items 304a-304d. In one or more embodiments, a graph embedding includes an item embedding based on a graph network of interconnected nodes. Indeed, in one or more embodiments, the sequential recommender system 106 generates a graph network (e.g., a knowledge graph) that includes a plurality of nodes representing digital content items and further includes edges between nodes representing relationships between the corresponding digital content items. To illustrate, in one or more embodiments, the sequential recommender system 106 generates an edge between two nodes upon determining that their corresponding digital content items are related (e.g., based on the interactions of client devices with the digital content items). In some instances, the relationship between digital content items is further reflected by the proximity of their nodes within the graph network. In one or more embodiments, a graph embedding includes an item embedding that represents the position and connections of a node that corresponds to a digital content item within the graph network.

In some cases, the sequential recommender system 106 generates the graph embeddings 310 utilizing the graph network representing the digital content items. For example, in one or more embodiments, the sequential recommender system 106 utilizes a graph neural network—including at least one of a graph convolutional network, a graph attention network, or a graph recurrent network—to generate graph embeddings from a graph network representing a plurality of digital content items.

Though not illustrated, in some instances, the sequential recommender system 106 generates the item embeddings 306 utilizing a similarity matrix (e.g., a sparse matrix). For example, in some cases, the sequential recommender system 106 determines metadata associated with the digital content items and generates a similarity matrix utilizing the metadata. The sequential recommender system 106 generates the item embeddings 306 from the matrix.

In one or more implementations, the sequential recommender system 106 further generates the item embeddings 306 to incorporate user embeddings. For example, in some cases, the sequential recommender system 106 generates the item embeddings 306 to incorporate characteristics or attributes associated with client devices (e.g., demographic information) and/or user id numbers associated with the client devices.

As mentioned above, upon monitoring the user interactions of a client device with one or more digital content items during an interaction session, the sequential recommender system 106 generates interactions maps. FIGS. 4A-4D illustrate diagrams for generating interaction maps utilizing user interactions of a client device in accordance with one or more embodiments. FIG. 4E illustrates a diagram of interaction maps associated with a plurality of interaction sessions of a client device in accordance with one or more embodiments.

In one or more embodiments, an interaction map includes a set of digital content items for which a client device has a determined (e.g., estimated) interest and/or disinterest. For example, in some implementations, an interaction map includes a set of values—such as a vector or a matrix—where the values represent digital content items for which a client device has a determined interest or disinterest based on the user interactions of the client device during an interaction session. To illustrate, in some cases, an interaction map includes the item embeddings corresponding to those digital content items for which a client device has a determined interest or disinterest. In one or more embodiments, an interaction map includes values representing one or more of the digital content items with which the client device interaction during the interaction. In some cases, as will be explained in more detail below, an interaction map includes values representing one or more other digital content items.

Figure 4A:
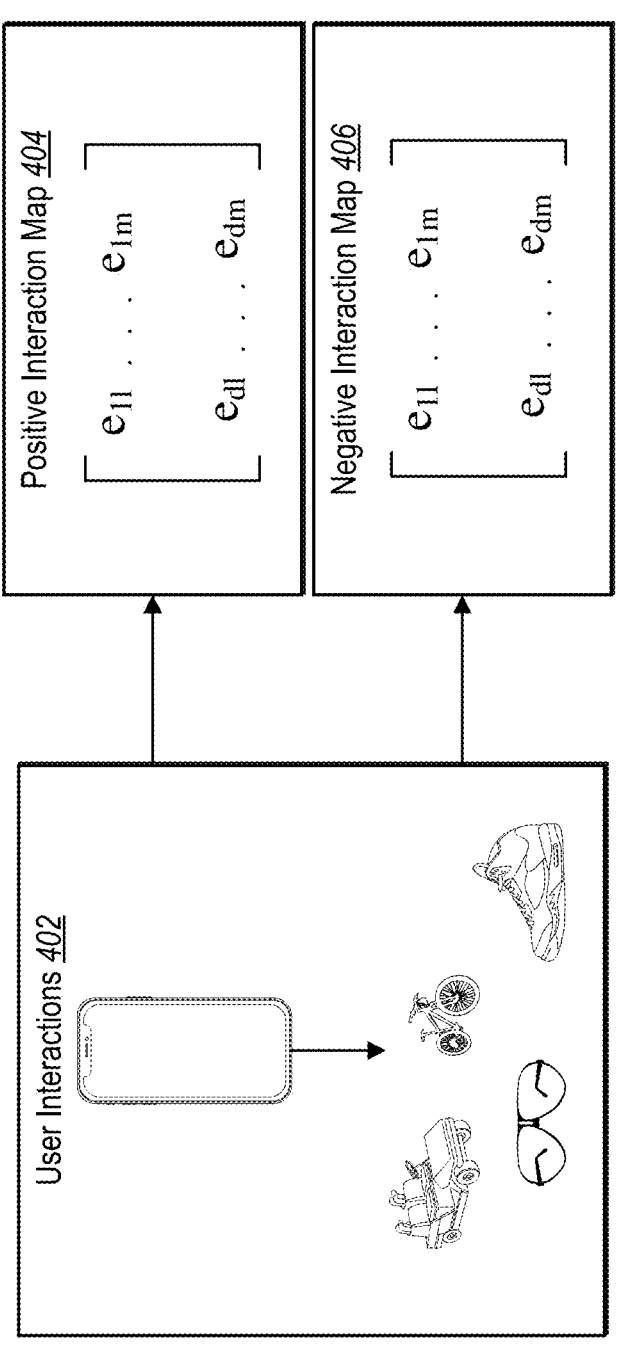
FIGS. 4A-4D illustrate diagrams for generating interaction maps utilizing user interactions of a client device in accordance with one or more embodiments.

Indeed, as shown in FIG. 4A, the sequential recommender system 106 generates interaction maps from user interactions 402 of a client device with one or more digital content items during an interaction session. In particular, as shown in FIG. 4A, the sequential recommender system 106 generates a positive interaction map 404 and a negative interaction map 406.

In one or more embodiments, a positive interaction map includes an interaction map including a set of digital content items for which a client device has a determined interest. For example, in some cases, a positive interaction map includes one or more digital content items with which the client device interacted positively during an interaction session and/or other digital content items for which the client device has a determined interest. Similarly, in some instances, a negative interaction map includes an interaction map including a set of digital content items for which a client device has a determined disinterest. For example, in some cases, a negative interaction map includes one or more digital content items with which the client device interacted negatively during an interaction session and/or other digital content items for which the client device has a determined disinterest.

As just discussed, in one or more embodiments, the sequential recommender system 106 generates a positive interaction map and a negative interaction map using user interactions of a client device with one or more digital content items. In some implementations, the sequential recommender system 106 further generates the positive interaction map and/or negative interaction map utilizing other digital content items (e.g., the item embeddings corresponding to other digital content items). In particular, in some cases, the sequential recommender system 106 utilizes other digital content items from the plurality of digital content items that include those digital content items with which the client device interacted during the interaction session.

Figure 4B:
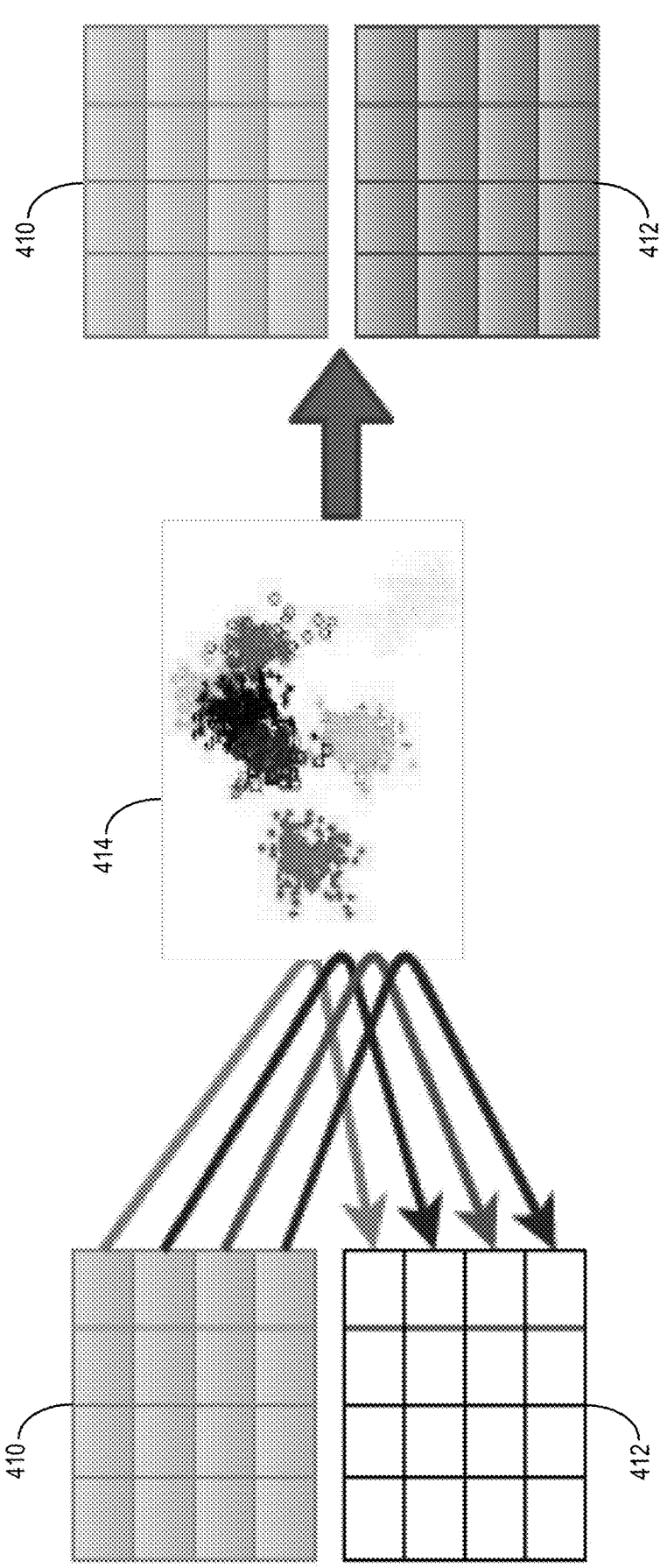
Figure 4C:
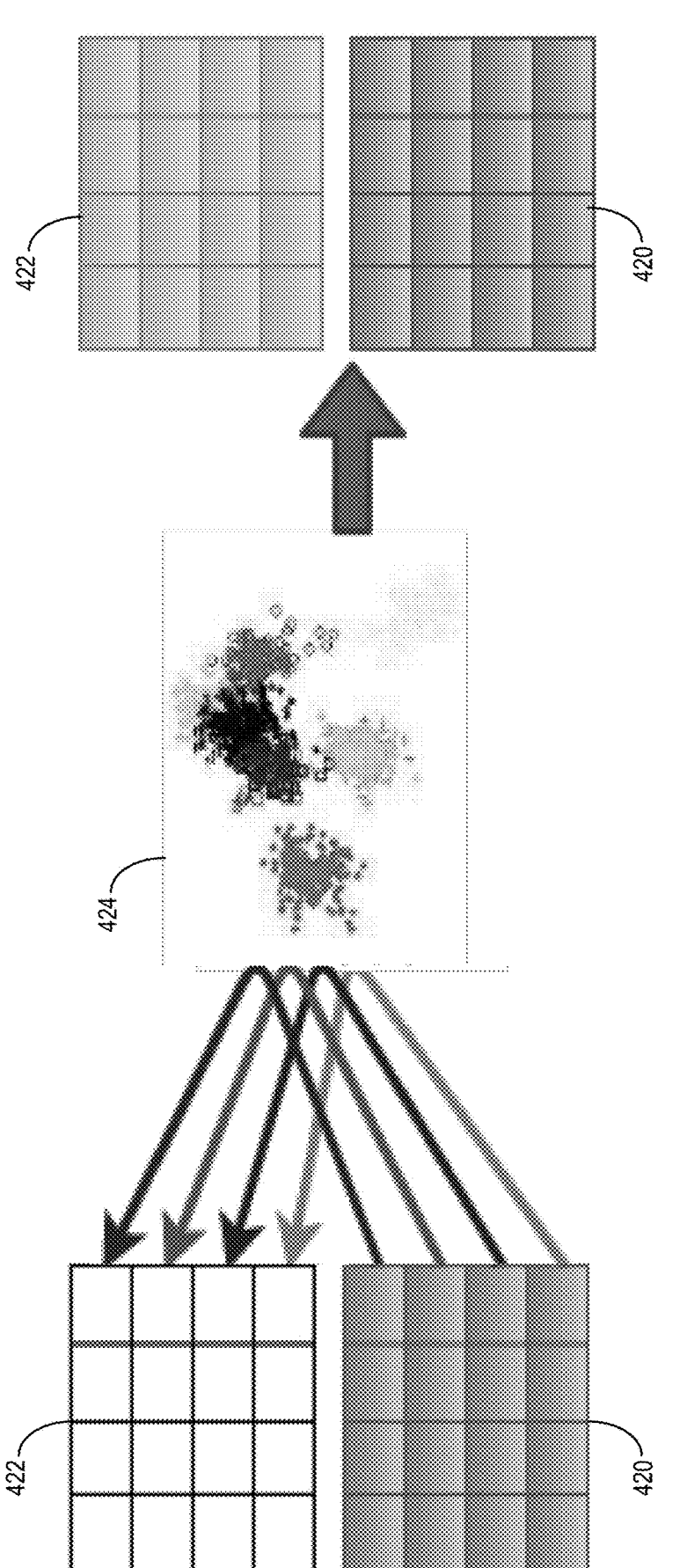

Indeed, in one or more embodiments, the sequential recommender system 106 establishes a number of digital content items d to be represented in each of the positive and negative interaction maps. In one or more embodiments, $d>=n$ (the number of digital content items recommended during a given time step) so that each interaction map can represent feedback provided for at least the n digital content items. Accordingly, the sequential recommender system 106 does not generate both of the positive and negative interaction maps solely based on the user interactions with the n digital content items. Rather, the sequential recommender system 106 further utilizes other digital content items (e.g., the item embeddings of other digital content items) to fill the space remaining in the positive and negative interaction maps after inclusion of the digital content items with which the client device interacted. FIGS. 4B-4C illustrate diagrams for generating the positive and negative interaction maps in three different scenarios in accordance with one or more embodiments. To be noted, in some instances, the sequential recommender system 106 sets the size of item embeddings to m so that the dimensions of each interaction map is d×m. In other words, $I_{set}^-, I_{set}^- \in \mathbb{R}^{d \times m}$.

FIG. 4B illustrates a scenario in which the client device interacted positively with each of the n digital content items during the interaction session. Accordingly, the sequential recommender system 106 determines that there are n positive interactions and no negative interactions. Thus, the sequential recommender system 106 generates a completed positive interaction map 410 based entirely on the positive interactions of the client device (where d=n). In particular, in some cases, the sequential recommender system 106 generates the positive interaction map 410 using a positive item embedding for each positive interaction of the client device.

Because there were no negative interactions observed, the sequential recommender system 106 does not generate the negative interaction map 412 using negative interactions of the client device (e.g., the negative interaction map 412 remains empty). Rather, the sequential recommender system 106 utilizes other digital content items to generate the negative interaction map 412. As shown in FIG. 4B, the sequential recommender system 106 utilizes the positive item embeddings included in the positive interaction map 410 to determine negative item embeddings of other digital content items to include in the negative interaction map 412.

To illustrate, in one or more embodiments, the sequential recommender system 106 identifies the positive item embeddings within an item embedding space 414. The sequential recommender system 106 further determines (e.g., a d number of) negative item embeddings based on a distance from the positive item embeddings within the item embedding space 414. For example, in some cases, the sequential recommender system 106 determines the negative item embeddings to be those item embeddings that are farthest from the positive item embeddings within the item embedding space 414. Thus, the sequential recommender system 106 generates the negative interaction map 412 using the determined negative item embeddings.

FIG. 4C illustrates a scenario in which the client device interacted negatively with each of the n digital content items during the interaction session. Accordingly, the sequential recommender system 106 determines that there are n negative interactions and no positive interactions for the interaction session. Thus, the sequential recommender system 106 generates a completed negative interaction map 420 based entirely on the negative interactions of the client device (where d=n). In particular, in some cases, the sequential recommender system 106 generates the negative interaction map 420 using a negative item embedding for each negative interaction of the client device.

Because there were no positive interactions observed, the sequential recommender system 106 does not generate the positive interaction map 422 using positive interactions of the client device (e.g., the positive interaction map 422 remains empty). Rather, the sequential recommender system 106 utilizes other digital content items to generate the positive interaction map 422. As shown in FIG. 4C, the sequential recommender system 106 utilizes the negative item embeddings included in the negative interaction map 420 to determine positive item embeddings of other digital content items to include in the positive interaction map 422.

To illustrate, in one or more embodiments, the sequential recommender system 106 identifies the negative item embeddings within an item embedding space 424. The sequential recommender system 106 further determines (e.g., a d number of) positive item embeddings based on a distance from the negative item embeddings within the item embedding space 424. For example, in some cases, the sequential recommender system 106 determines the positive item embeddings to be those item embeddings that are farthest from the negative item embeddings within the item embedding space 424. Thus, the sequential recommender system 106 generates the positive interaction map 422 using the determined negative item embeddings.

Figure 4D:
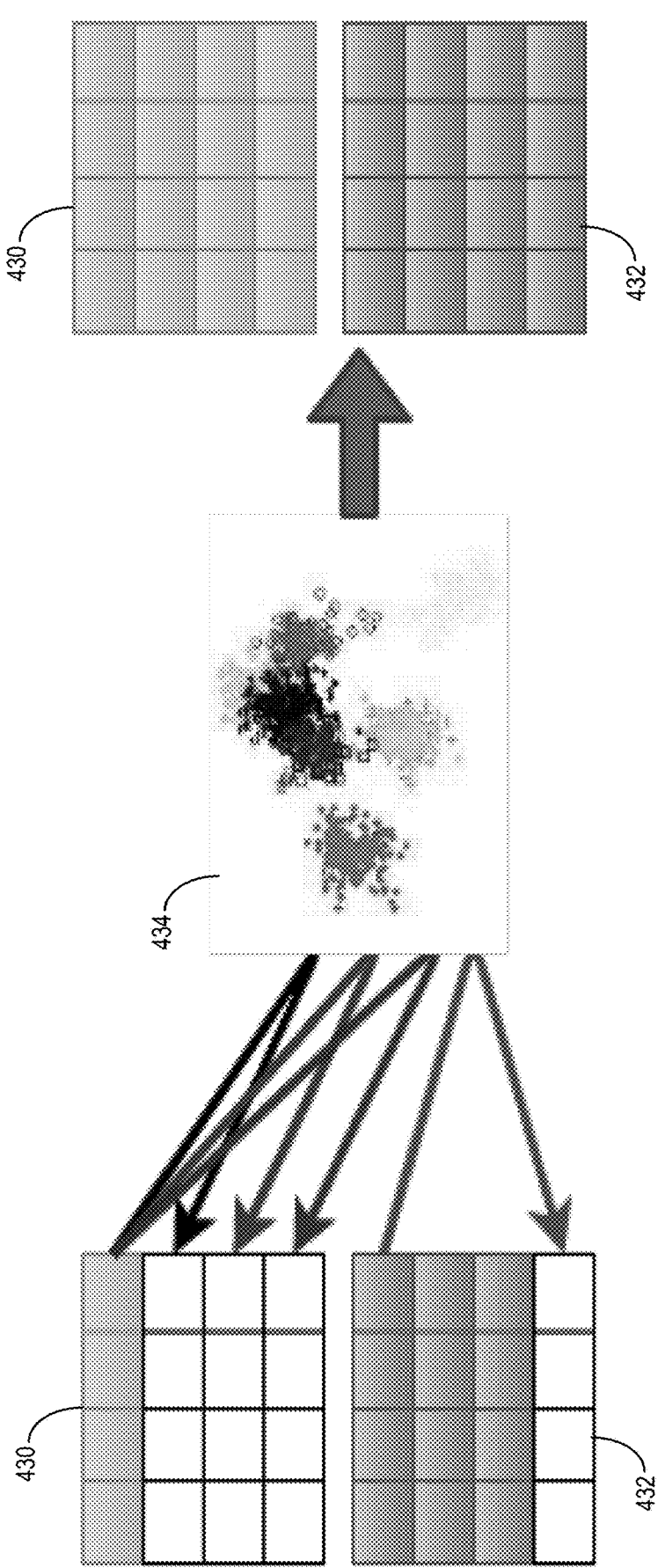
Figure 4E:
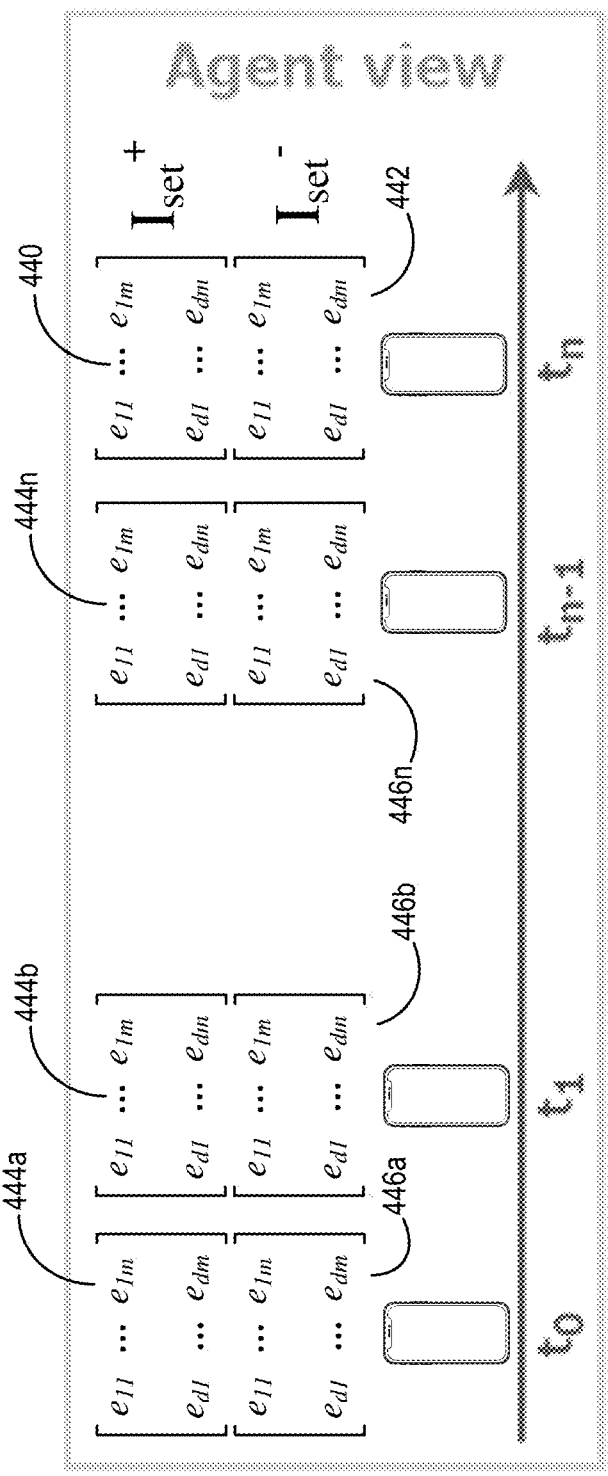
FIG. 4E illustrates a diagram of interaction maps associated with a plurality of interaction sessions of a client device in accordance with one or more embodiments.

FIG. 4D illustrates a scenario in which the client device interacted positively with some of the n digital content items during the interaction session and interacted negatively with some of the digital content items. Accordingly, in one or more embodiments, the sequential recommender system 106 generates the positive interaction map 430 partially using the positive interactions and generates the negative interaction map 432 partially using the negative interactions.

In particular, as shown in FIG. 4D, the sequential recommender system 106 utilizes the positive item embeddings corresponding to the digital content items with which the client device interacted positively to determine additional item embeddings of other digital content items to include in the positive interaction map 430. To illustrate, in one or more embodiments, the sequential recommender system 106 identifies the positive item embeddings corresponding to the digital content items with which the client device interacted positively within an item embedding space 434. The sequential recommender system 106 further determines one or more additional positive item embeddings based on a proximity to the positive item embeddings within the item embedding space 434. For example, in some cases, the sequential recommender system 106 determines the one or more additional positive item embeddings to be those item embeddings that are closest to the positive item embeddings within the item embedding space 434. Thus, the sequential recommender system 106 generates the positive interaction map 430 using the determined additional positive item embeddings.

Similarly, as shown in FIG. 4D, the sequential recommender system 106 utilizes the negative item embeddings corresponding to the digital content items with which the client device interacted negatively to determine additional item embeddings of other digital content items to include in the negative interaction map 432. To illustrate, in one or more embodiments, the sequential recommender system 106 identifies the negative item embeddings corresponding to the digital content items with which the client device interacted negatively within an item embedding space 434. The sequential recommender system 106 further determines one or more additional negative item embeddings based on a proximity to the negative item embeddings within the item embedding space 434. For example, in some cases, the sequential recommender system 106 determines the one or more additional negative item embeddings to be those item embeddings that are closest to the negative item embeddings within the item embedding space 434. Thus, the sequential recommender system 106 generates the negative interaction map 432 using the determined additional negative item embeddings.

Thus, the sequential recommender system 106 augments the user interactions of a client device with the relationships between digital content items. Moreover, the sequential recommender system 106 utilizes the augmented user interactions to generate a recommendation. Further, in one or more embodiments, the sequential recommender system 106 utilizes every negative interaction of the client device that occurred within the interaction session to generate the negative interaction map (where available). When compared to conventional systems that often sample from the negative interactions or ignore negative interactions entirely, the sequential recommender system 106 more exhaustively utilizes indications of user preferences associated with a client device, leading to recommendations that more accurately capture those user preferences.

It should be noted that the above discussion refers particularly to instances in which d=n so that the sequential recommender system 106 can generate at least one of the interaction maps when every user interaction within an interaction session was positive or negative. In some implementations, however, the sequential recommender system 106 establishes d>n so that neither interaction map can be generated solely using the user interactions from an interaction session. Thus, in some instances, the sequential recommender system 106 generates both the positive and negative interaction maps at least partially using the item embeddings corresponding to digital content items with which the client device did not interact during the interaction session.

While FIG. 4D illustrates using positive item embeddings to generate a positive interaction map and negative item embeddings to generate a negative interaction map, the sequential recommender system 106 can utilize both positive and negative item embeddings to generate either interaction map. To illustrate, in some cases, the sequential recommender system 106 determines other item embeddings for use in generating a positive interaction map based on both proximity to the positive item embeddings and distance from the negative item embeddings. For example, in at least one instance, the sequential recommender system 106 determines, for the other item embeddings, a weighted combination of the proximity to the positive item embeddings and the distance from the negative item embeddings. The sequential recommender system 106 then selects item embeddings for use in generating the positive interaction map based on the weighted combination. Thus, the sequential recommender system 106 selects other item embeddings that correspond to digital content items that are both similar to digital content items with which the client device interacted positively and dissimilar to digital content items with which the client device interacted negatively.

In some instances, the sequential recommender system 106 utilizes a weighted average. For example, in some cases, when generating a positive interaction map, the sequential recommender system 106 weighs the proximity to the positive item embeddings more heavily to emphasize similarity with those digital content items with which the client device interacted positively. In some cases, the sequential recommender system 106 weights the distance to the negative item embeddings more heavily to emphasize dissimilarity with those digital content items with which the client device interacted negatively. In some cases, the sequential recommender system 106 similarly weighs the proximity to negative item embeddings or the distance from positive item embeddings when generating a negative interaction map.

In one or more embodiments, in addition to using interaction maps generated for a particular interaction session to generate a recommendation for a subsequent interaction session, the sequential recommender system 106 further utilizes interaction maps generated for previous interaction sessions. FIG. 4E illustrates a plurality of interaction maps including interaction maps from previous interaction sessions in accordance with one or more embodiments.

In particular, FIG. 4E illustrates a positive interaction map 440 and a negative interaction map 442 for a particular interaction session (labeled $t_n$). Further, FIG. 4E illustrates a plurality of previous positive interaction maps 444a-444n and a plurality of previous negative interaction maps 446a-446n for a plurality of previous interaction sessions (labeled $t_0, t_1, \ldots, t_{n-1}$). In one or more embodiments, the sequential recommender system 106 generates the previous positive interaction maps 444a-444n and the previous negative interaction maps 446a-446n using user interactions from the previous interaction sessions and item embeddings corresponding to other digital content items as discussed above.

As will be shown below with reference to FIG. 5A, in some cases, the sequential recommender system 106 utilizes one or more of the previous positive interaction maps 444a-444n and the previous negative interaction maps 446a-446n along with the positive interaction map 440 and the negative interaction map 442 to determine one or more digital content items to provide for display to a client device. Thus, in one or more embodiments, the sequential recommender system 106 incorporates much (e.g., all) of a client device's interaction history when generating a recommendation for a subsequent interaction session.

As previously mentioned, in one or more embodiments, the sequential recommender system 106 utilizes a reinforcement learning model to generate a recommendation for a client device. FIG. 5A illustrates an architecture of a reinforcement learning model in accordance with one or more embodiments.

In one or more embodiments, a reinforcement learning model includes a computer model or algorithm that operates to improve or maximize the reward obtained by an agent executing actions within an environment. In particular, in one or more embodiments, a reinforcement learning model includes a computer algorithm that implements a policy for selecting an action while in a particular state. To illustrate in one or more embodiments, a reinforcement learning model includes a computer algorithm for determining one or more digital content items to provide to a client device based on the state(s) of the client device. In some implementations, a reinforcement learning model further modifies its internal parameters based on feedback received (or generated) regarding the selected action.

Figure 5A:
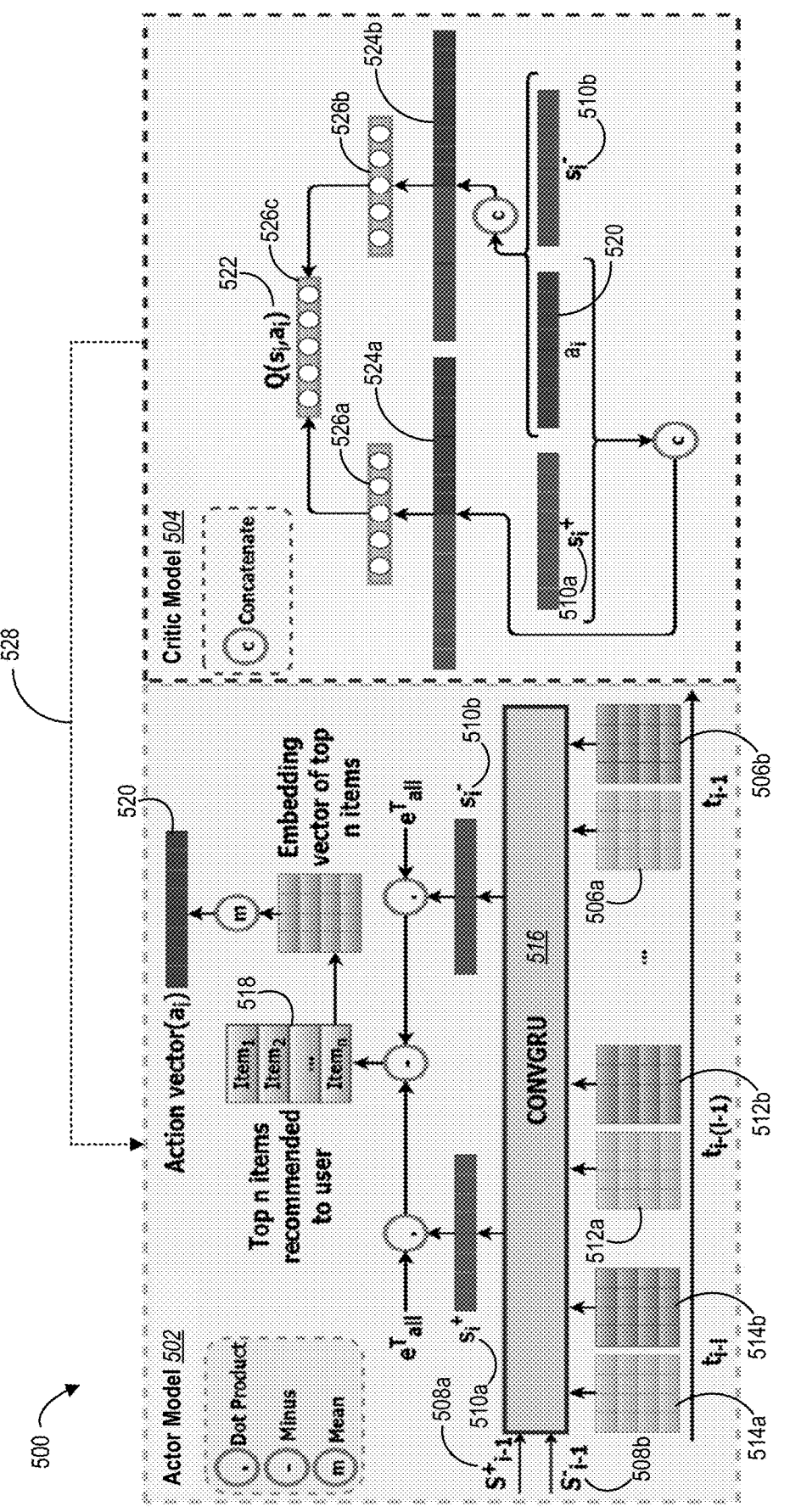
FIG. 5A illustrates an architecture of a reinforcement learning model in accordance with one or more embodiments.

As shown in FIG. 5A, the sequential recommender system 106 utilizes a reinforcement learning model 500 having an actor-critic framework. In particular, the reinforcement learning model 500 includes an actor model 502 and a critic model 504. In one or more embodiments, an actor model includes a computer model or algorithm that selects or generates an action while in a particular state. For example, in some instances, an actor model includes a model or algorithmic component of a reinforcement learning model that determines one or more digital content items to provide to a client device. In some implementations, a critic model includes a computer model or algorithm that provides feedback regarding an action. In particular, in some instances, a critic model includes a computer algorithm that evaluates an action selected or generated by a corresponding actor model.

As shown in FIG. 5A, to generate a recommendation for a client device for time step $t_i$ (e.g., the next interaction session), the actor model 502 of the reinforcement learning model 500 analyzes the positive interaction map 506a and the negative interaction map 506b generated from the user interactions of the client device during the prior interaction session $t_{i-1}$. Further, the actor model 502 analyzes the positive state 508a and the negative state 508b of the client device for the prior interaction session $t_{i-1}$.

As previously mentioned, in one or more embodiments, a state of a client device includes preferences associated with the client device. In particular, in one or more embodiments, a state of a client device includes a value or set of values representing the client device at a particular time or time range (e.g., the interests and/or disinterests of the client device). For example, in some cases, a state of a client device includes a set of values representing those digital content items for which the client device has a determined interest and/or those digital content items for which the client device has a determined disinterest.

In one or more embodiments, as discussed above, the sequential recommender system 106 distinguishes between a positive state and a negative state for a client device. Accordingly, in some implementations, a positive state of a client device includes a set of values representing those digital content items for which the client device has a determined interest. Likewise, in some cases, a negative state of a client device includes a set of values representing those digital content items for which the client device has a determined disinterest.

As further shown in FIG. 5A, the actor model 502 generates a positive state 510a and a negative state 510b of the client device for the interaction session $t_i$. In particular, the actor model 502 generates the positive state 510a and the negative state 510b based on the positive interaction map 506a and the negative interaction map 506b generated for the prior interaction session $t_{i-1}$, as well as the positive state 508a and the negative state 508b of the client device for the prior interaction session $t_{i-1}$.

As shown, the actor model 502 further generates the positive state 510a and the negative state 510b based on additional interaction maps. Indeed, in some implementations, the actor model 502 generates the positive state 510a and the negative state 510b utilizing the interaction maps corresponding to the l prior interaction sessions. In particular, in one or more embodiments, the actor model 502 generates the states for interaction session $t_i$ using the interaction maps generated for interaction session $t_{i-1}$ to interaction session $t_{i-l}$ (including the interaction maps 512a-512b and the interaction maps 514a-514b). Thus, in some cases, the actor model 502 incorporates a history of user interactions of the client device when generating the states of the client device for the interaction session $t_i$. In one or more implementations, the sequential recommender system 106 establishes l based on user input.

As shown in FIG. 5A, the actor model 502 utilizes at least one convolutional gated recurrent unit neural network layer 516 to generate the positive state 510*a* and the negative state 510*b* of the client device. Indeed, as will be shown in more detail in FIG. 5B, the actor model 502 utilizes multiple convolutional gated recurrent unit neural network layers to generate the positive state 510*a* and the negative state 510*b* in some embodiments. In one or more embodiments, the actor model 502 utilizes the at least one convolutional gated recurrent unit neural network layer 516 to generate the positive state 510*a* and the negative state 510*b* in accordance with the following:

$$z_t=\sigma(W_z*x_t+U_z*_{t-1})$$

$$r_t=\sigma(W_r*x_t+U_r*h_{t-1})$$

$$h_t=(1-z_t)h_{t-1}+z_t\tanh(W*x_t+U*(r_t\circ h_{t-1})) \qquad (2)$$

In equation 2, $z_t$ represents an update gate at time t, $r_t$ is a reset gate at time t and $h_t$ is the updated hidden state at time t. Further, the operator $\circ$ denotes element-wise multiplication, and the operator * denotes convolution. In one or more embodiments, the sequential recommender system 106 sets the size of the states of a client device to m, which is the size of the item embeddings. Accordingly, $s_i^+$, $s_i^- \in \mathbb{R}^{1\times m}$ facilitates the operations in matrix form between states and item embeddings.

As shown in FIG. 5A, the actor model 502 utilizes the positive state 510*a* and the negative state 510*b* of the client device to determine one or more digital content items to provide to the client device during the interaction session interaction session $t_i$. For example, as shown, the actor model determines a first similarity metric between the positive state 510*a* and the set of item embeddings. Further, the actor model determines a second similarity metric between the negative state 510*b* and the set of item embeddings. In one or more embodiments, a similarity metric includes a value or set of values that represents a similarity between a state and a set of item embeddings. For example, in some cases, a similarity metric includes a Jaccard similarity, a Manhatten distance, or a Euclidean distance, or a cosine similarity.

Indeed, in one or more embodiments, the actor model 502 determines the first similarity metric by determining a first cosine similarity A between the positive state 510*a* and the set of item embeddings $$e_{all}^T \text{ as } A = s_i^+ \cdot e_{all}^T.$$

Similarly, the actor model 502 determines the second similarity metric by determining a second cosine similarity B between the negative state 510*b* and the set of item embeddings as $$B = s_i^- \cdot e_{all}^T.$$

Accordingly, as shown in FIG. 5A, the actor model 502 determines the one or more digital content items to provide to the client device during the interaction session interaction session $t_i$ based on the first similarity metric and the second similarity metric. For example, as shown, the actor model 502 determines the difference between the first cosine similarity and the second cosine similarity as A-B. In one or more embodiments, the first cosine similarity and the second cosine similarity provide an indication of the interest and disinterest, respectively, of the client device for each digital content item represented within the set of item embeddings. Accordingly, by determining the difference between the cosine similarities the actor model 502 determines a current interest of the client device.

Indeed, in one or more embodiments, utilizing the difference of the cosine similarities, the actor model 502 determines the top n digital content items 518. In particular, the actor model 502 determines the top n digital content items 518 using the set of item embeddings within the item embedding space. For instance, in some cases, the difference between the cosine similarities indicates an area within the item embedding space that contains item embeddings for digital content items in which the client device would be interested. For example, in some cases, the difference indicates an area within the item embedding space that is proximate to a location indicated by the positive state 510*a* and distant from a location indicated by the negative state 510*b*.

In one or more embodiments the actor model 502 ranks the digital content items corresponding to the item embeddings near/within the area of the item embedding space indicated by the difference between the cosine similarities. In particular, the actor model 502 ranks the digital content items based on the proximity of their item embeddings to the location indicated by the positive state 510*a* and their distance from the location indicated by the negative state 510*b*. Further, the actor model 502 identifies the n digital content items with the highest ranking (or lowest ranking, depending on how ranks are assigned) and selects those n digital content items for provision to the client device.

Thus, the reinforcement learning model 500 generates a recommendation for the client device by determining n digital content items to provide for display. By utilizing this neighborhood search strategy, the sequential recommender system 106 navigates large search spaces more efficiently than conventional systems—particularly when n>1—as it avoids consideration of all possible recommendation permutations. In one or more embodiments, the sequential recommender system 106 provides the n digital content items to the client device for display during the interaction session $t_i$.

In some implementations, rather than utilizing the process described above for determining the n digital content items to provide to the client device, the actor model 502 utilizes a neural network to select the n digital content items. For example, in some cases, the actor model 502 utilizes a trained neural network to analyze the positive state 510*a* and the negative state 510*b*. In some embodiments, the actor model 502 further utilizes the trained neural network to analyze the set of item embeddings. Accordingly, the neural network generates a recommendation for n digital content items based on the positive state 510*a*, the negative state 510*b*, and the set of item embeddings. For example, in some instances, the neural network outputs the n item embeddings or some other indication of the n item embeddings corresponding to the n digital content items to be provided to the client device.

As shown in FIG. 5A, the actor model 502 further generates an action vector 520 based on the n digital content items selected for provision to the client device. As previously mentioned, in one more embodiments, an action vector $a_i$ includes a vector of values representing the action selected by the actor model 502 for an interaction session $t_i$. For example, in some implementations, an action vector includes values representing the item embeddings corresponding to the n digital content items selected. To illustrate, as shown in FIG. 5A, the actor model determines the action vector 520 by determining the mean of the item embeddings corresponding to the n digital content items selected for provision to the client device. In some implementations, however, the actor model 502 determines the action vector 520 by compiling a matrix that includes the item embeddings of the n digital content items directly.

As illustrated in FIG. 5A, the critic model 504 determines a value function 522 for the action selected by the actor model 502 (i.e., the n digital content items). In one or more embodiments, a value function includes a measure of the quality of an action selected by the actor model 502. For example, in one or more embodiments, a value function includes a function used for measuring the quality of the action. In some instances, the value function refers to the output of such a function, the output including a value or set of values that indicates the quality of the measured action.

As shown in FIG. 5A, the critic model 504 determines the value function 522 utilizing the positive state 510*a*, the negative state 510*b*, and the action vector 520 determined by the actor model 502. For example, as shown, the critic model 504 determines a first state-action vector 524*a* utilizing the positive state 510*a* and the action vector 520. For example, in one or more embodiments, the critic model 504 combines (e.g., concatenates) the positive state 510*a* and the action vector 520 to generate the first state-action vector 524*a*. Similarly, as shown, the critic model 504 determines a second state-action vector 524*b* utilizing the negative state 510*b* and the action vector 520. For example, in one or more embodiments, the critic model 504 combines (e.g., concatenates) the negative state 510*b* and the action vector 520 to generate the second state-action vector 524*b*.

Further, as shown in FIG. 5A, the critic model 504 determines the value function 522 utilizing the first state-action vector 524*a* and the second state-action vector 524*b*. In particular, as shown, the critic model 504 includes a plurality of rectified linear interaction neural network layers. Indeed, in one or more embodiments, the critic model 504 includes a neural network, such as a deep Q-network. In some implementations, however, the critic model 504 includes a Q-learning model.

As shown in FIG. 5A, the critic model 504 utilizes the rectified linear interaction neural network layers to determine the value function 522. To illustrate, in one or more embodiments, the critic model 504 determines a first set of feature values based on the first state-action vector 524*a* utilizing a first rectified linear interaction neural network layer 526*a*. Additionally, the critic model 504 determines a second set of feature values based on the second state-action vector 524*b* utilizing a second rectified linear interaction neural network layer 526*b*.

In one or more embodiments, a feature value includes a hidden or latent feature. In some implementations, a feature value includes a hidden or latent feature extracted or otherwise determined from a state-action vector. To illustrate, in some embodiments, a feature value includes a value representing an attribute or characteristic of a state of a client device and/or a selected action (e.g., digital content items selected for provision to the client device). For instance, in some cases, a feature value includes a value that relates to user features/preferences associated with a client device.

As further shown in FIG. 5A, the critic model utilizes a third rectified linear interaction neural network layer 526*c* to determine the value function 522 based on the first set of feature values and the second set of feature values. Thus, the critic model 504 evaluates the action selected by the actor model 502. In particular, the critic model 504 evaluates how well the n digital content items selected for transmission to the client device satisfy the preferences/interests associated with the client device as represented by the positive state 510*a* and the negative state 510*b*.

As shown in FIG. 5A, the reinforcement learning model 500 back propagates the value function 522 to the actor model 502 (as shown by the dashed line 528). In particular, the reinforcement learning model 500 utilizes the value function 522 to modify the parameters of the actor model 502 (e.g., the parameters of the at least one convolutional gated recurrent unit neural network layer 516).

In one or more embodiments, the sequential recommender system 106 utilizes the reinforcement learning model 500 having the modified parameters to generate a recommendation for the interaction session $t_{i+1}$. Indeed, in some implementations, the sequential recommender system 106 monitors additional user interactions of the client device with the n digital content items recommended for the interaction session $t_i$. Based on the additional user interactions, the sequential recommender system 106 generates an additional recommendation for the interaction session $t_{i+1}$ utilizing the reinforcement learning model 500 having the modified parameters. Thus, the sequential recommender system 106 can iteratively utilize the reinforcement learning model 500 to generate a recommendation for the client device using the actor model 502, evaluate the recommendation using the critic model 504, and then modify the parameters of the actor model 502 based on the evaluation provided by the critic model 504. In this manner, the sequential recommender system 106 can continuously update its parameters (and digital content selection policy).

By using item embeddings—such as those generated via collaborative filtering—and reinforcement learning, the sequential recommender system 106 operates more flexibly than conventional systems. For example, the sequential recommender system 106 both leverages the relationships between digital content items and accommodates dynamic user preferences. By taking advantages of these feature, the sequential recommender system 106 further generates recommendations that more accurately reflect the preferences associated with a client device.

Further, the sequential recommender system 106 operates more efficiently. Indeed, by utilizing the item embeddings, the sequential recommender system 106 narrows down the search space with regard to the digital content items. Additionally, the sequential recommender system 106 utilizes neural networks to approximate the optimal policy rather than determining the optimal policy completely. Thus, the sequential recommender system 106 preserves computing resources and can operate with more speed. This allows for greater scalability, and the sequential recommender system 106 is deployed more practically in environments with large state and action spaces when compared to conventional systems.

Figure 5B:
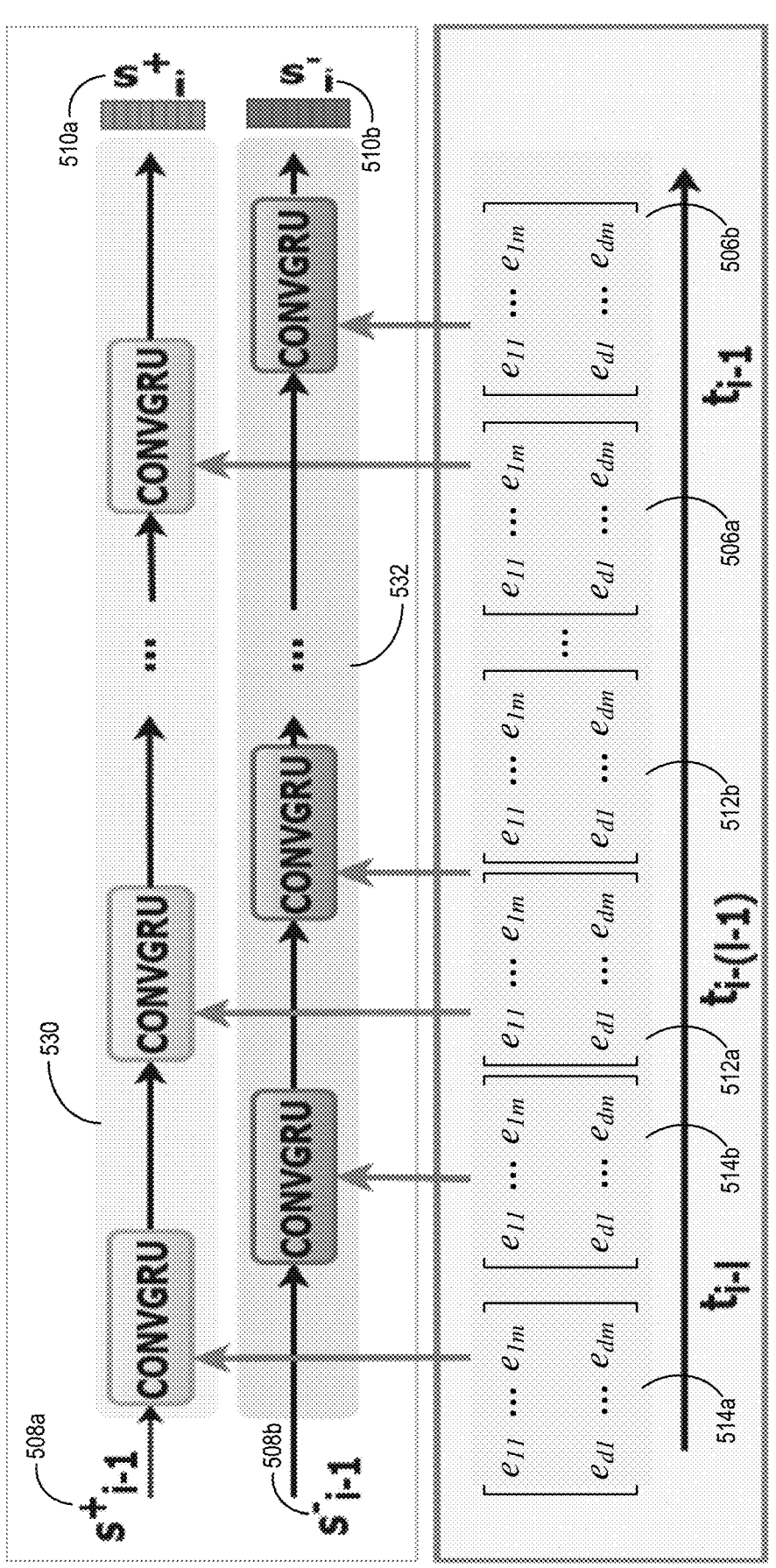
FIG. 5B illustrates a plurality of convolutional gated recurrent unit neural network layers for generating a positive state and a negative state of a client device in accordance with one or more embodiments.

As mentioned above, in one or more embodiments, the reinforcement learning model 500 (i.e., the actor model 502) utilizes a plurality of convolutional gated recurrent unit neural network layers to generate the positive state 510*a* and the negative state 510*b* for the client device. FIG. 5B illustrates a plurality of convolutional gated recurrent unit neural network layers for generating a positive state and a negative state of a client device in accordance with one or more embodiments.

Indeed, as shown in FIG. 5B, the reinforcement learning model 500 includes a first convolutional gated recurrent unit neural network layer 530 and a second convolutional gated recurrent unit neural network layer 532. In one or more embodiments, the first and second convolutional gated recurrent unit neural network layers 530, 532 are independent and do not share weights. In some implementations however, the first and second convolutional gated recurrent unit neural network layers 530, 532 do share weights or at least have a set of common weights.

As further shown, the reinforcement learning model 500 utilizes the first convolutional gated recurrent unit neural network layer 530 to generate the positive state 510a and utilizes the second convolutional gated recurrent unit neural network layer 532 to generate the negative state 510b. In particular, the reinforcement learning model 500 utilizes the first convolutional gated recurrent unit neural network layer 530 to generate the positive state 510a by analyzing the positive state 508a of the client device for the prior interaction session $t_{i-1}$ and the positive interaction maps for the l prior interaction sessions. Likewise, the reinforcement catastrophic forgetting. For example, in implementing the TD3 algorithm, the sequential recommender system 106 implements clipped double-Q learning by learning two value functions (i.e., critic models) instead of one and taking the smallest of the two value functions to form the targets in the Bellman error loss functions. Additionally, the sequential recommender system 106 applies delayed policy updates, updating the policy (and target networks) less frequently than the value function. For example, in some implementations, the sequential recommender system 106 updates the policy once after every two value function updates for more stable and efficient training. Further, the sequential recommender system 106 implements target policy smoothing by adding noise to the target action in order to prevent the policy from exploiting the value function error.

The algorithm presented below is another characterization of how the sequential recommender system 106 implements the TD3 algorithm to train the reinforcement learning model.

---

Algorithm

Initialize critic networks $Q_{\theta_1}$, $Q_{\theta_2}$, and actor network $\pi_\theta$ with random parameters $\theta_1$, $\theta_2$, $\phi$
Initialize target networks $\theta_1' \leftarrow \theta_1$, $\theta_2' \leftarrow \theta_2$, $\phi' \leftarrow \phi$
Initialize replay buffer $\mathcal{B}$
for t = 1 to T do Select action with exploration noise $a \sim \pi_\theta(s) + \epsilon$, $\epsilon \sim \mathcal{N}(0, \sigma_1)$ and observe reward r and new state s'

Store transition tuple (s, a, r, s') in $\mathcal{B}$

Sample mini-batch of N transitions from $\mathcal{B}$
    Compute target actions $$a'(s') = \text{clip}\,(\mu_{\theta_{targ}}(s') + \text{clip}(\epsilon, -c, c), a_{Low}, a_{High})\,, \epsilon \sim \mathcal{N}(0, \sigma_2)$$

Compute targets $$y(r, s', d) = r + \gamma(1 - d) \min_{i=1,2} Q_{\phi_{targ,i}}(s', a'(s'))$$

Update Q-functions by one step of gradient descent using $$\nabla_{\phi_i} \frac{1}{|B|} \sum_{(s,a,r,s',d)\in B} \left(Q_{\phi_i}(s, a) - y(r, s', d)\right)^2 \text{ for } i = 1, 2$$

if t mod policy_delay = 0 then
        Update policy by one step of gradient ascent using $$\nabla_\theta \frac{1}{|B|} \sum_{s\in B} \left(Q_{\phi_i}(s, \mu_\theta(s))\right)$$

Update target networks with
        $\phi_{targ,i} \leftarrow \rho\phi_{targ,i} + (1 - \rho)\phi_i$ for i = 1,2
        $\theta_{targ} \leftarrow \rho\theta_{targ} + (1 - \rho)\theta$
    end if
end for

--- learning model utilizes the second convolutional gated recurrent unit neural network layer 532 to generate the negative state 510b by analyzing the negative state 508b of the client device for the prior interaction session $t_{i-1}$ and the negative interaction maps for the l prior interaction sessions. Thus, in some implementations, the reinforcement learning model 500 determines the positive state 510a and the negative state 510b independently.

In one or more embodiments, the sequential recommender system 106 trains the reinforcement learning model 500 using the Twin Delayed Deep Deterministic Policy Gradients (TD3) algorithm. In particular, the sequential recommender system 106 utilizes the TD3 algorithm to overcome the overestimation of the value function that is common in the Deep Deterministic Policy Gradient (DDPG) algorithm, which may be used to train such models. The overestimation of the value function often leads to suboptimal policies or In the algorithm, the line for updating the Q-functions relates to updating the critic models utilized in training. Further, the line for updating the policy relates to updating the actor model of the reinforcement learning model.

Accordingly, in one or more embodiments, the sequential recommender system 106 trains a reinforcement learning model by training both the actor model and the critic model. In particular, the sequential recommender system 106 trains the actor and critic models by updating their parameters through the training iterations.

In some implementations, the sequential recommender system 106 utilizes historical data in the training process. For example, in some cases, the sequential recommender system 106 utilizes historical training data that includes training interactions of a client device with digital content items and ground truths that reflect the interactions of the client device with recommended digital content items for a given interaction session. The sequential recommender system 106 utilizes training interactions to determine a predicted recommendation using the actor model of the reinforcement learning model. The sequential recommender system 106 further utilizes the predicted recommendation (and corresponding predicted states) to determine a predicted value function using the critic model. The sequential recommender system 106 compares (e.g., via a loss function) the predicted value function with a ground truth indicating how the client device interacted with the digital content item(s) of the predicted recommendation. Thus, the sequential recommender system 106 determines the loss (e.g., error) of the critic model in determining value function. The sequential recommender system 106 back propagates the determined loss to the critic model and/or the actor model to update their respective parameters. In some implementations, the sequential recommender system 106 further compares (e.g., via a loss function) the predicted recommendation to a ground truth reflecting one or more digital content items that should've been recommended and back propagates the determined loss to the actor model to update its parameters. Through various iterations, the sequential recommender system 106 establishes parameters that facilitate accurate recommendations and/or value functions.

In one or more embodiments, after the training process, the sequential recommender system 106 further utilizes the trained model to generate recommendations for a client device. The sequential recommender system 106 utilizes the critic model to evaluate each recommendation and then further modifies the parameters of the actor model based on the evaluation.

As mentioned above, in one or more embodiments, the sequential recommender system 106 operates more accurately than conventional systems. Researchers have conducted studies to determine the accuracy of various embodiments of the sequential recommender system 106. FIG. 6 illustrates a table of various embodiments of the sequential recommender system 106 utilized for determining the effectiveness of the sequential recommender system 106.

As shown in FIG. 6, a first embodiment of the sequential recommender system 106 (labeled "Ours(−N)(−F)") does not integrate negative feedback (i.e., negative interactions). Further, the first embodiment includes a single convolutional gated recurrent unit neural network layer, which processes the positive interactions. A second embodiment of the sequential recommender system 106 (labeled "Ours(+N) (−F)") incorporates both negative and positive feedback. The second embodiment also includes a single convolutional gated recurrent unit neural network layer that processes both the positive and negative feedback. In both the first and second embodiments, a single digital content item is used for interacting with the client device. As further shown in FIG. 6, the third embodiment of the sequential recommender system 106 (labeled "Ours(+N)(+F)(d)") incorporates both negative feedback and relationships among the digital content items. The value d represents the maximum number of digital content items to be integrated or to be represented in each of the interaction maps. As will be shown below, the researchers implemented, within the studies, one variation of the Ours(+N)(+F)(d) model where d=3 and another implementation where d=5 (labeled "Ours(+N)(+F)(3)" and "Ours (+N)(+F)(5)" respectively).

In the studies, the researchers compared the performance of the different embodiments of the sequential recommender system 106 with the performance of various baseline models, which are often used in conventional recommendation systems. For example, the researchers compared the performance of a factorization machine model (labeled "FM"), which utilizes first-order interactions that linearly combines selected features of digital content items as well as second-order or pairwise interactions between each set of features. Further, the researchers compared the performance of a wide and deep model (labeled "WDL"), which includes a linear model that combines features and a deep component (e.g., a feed-forward neural network) that captures high-order feature interactions. Additionally, the researchers compared the performance of a deep factorization machine model (labeled "DeepFM"), which models lower-order and higher-order feature interactions. Further, the researchers compared the performance of a variation of the deep factorization machine model (labeled "xDeepFM") which includes a compressed interaction network component to model feature interactions at a vector-wise model. Additionally, the researchers compared the performance of a mixed logistic regression model (labeled "MLR"), which implements a piece-wise linear model and a $L_1$ and $L_{2,1}$ regularizer. The researchers further compared the performances of a linear upper confidence bound model (labeled as "LinUCB") and a hybrid LinUCB model (labeled as "HLinUCB").

The researchers performed the studies utilizing three datasets: an Adobe dataset from a digital marketing recommendation service; the CDs and Vinyl category from the Amazon 2014 publicly available dataset; and the MovieLens 1M publicly available dataset. In these datasets, the interactions are in the form of ratings with different scales. For each database, the researchers established a threshold where a rating at or above the threshold would be considered a positive interaction and a rating below the threshold would be considered a negative interaction. The researchers assigned a reward of five for a positive interaction and a reward of zero for a negative interaction.

The LinUCB and HLinUCB models, however, incorporate time complexities, so the researchers conducted to sets of studies. The first set of studies excluded the LinUCB and HLinUCB models and evaluates the performance of the remaining models on the full datasets. The second set of studies includes the LinUCB and HLinUCB models and evaluates the performance on subsets of the datasets. FIG. 7A illustrates a table reflecting statistics for the datasets used in the first set of studies. FIG. 7B illustrates a table reflecting statistics for the subsets of the datasets used in the second set of studies. In particular, when selecting the subset of data to use for the second set of studies the researchers selected the two hundred digital content items with the highest number of interactions and pruned the rest of the data based on these digital content items.

FIGS. 8A-8B illustrate tables reflecting experimental results regarding the effectiveness of the sequential recommender system 106 in accordance with one or more embodiments. In particular, the table of FIG. 8A reflects experimental results comparing the performance of the various embodiments of the sequential recommender system 106 on the full datasets shown in FIG. 7A. The table of FIG. 8B reflects experimental results comparing the performance of the various embodiments of the sequential recommender system 106 on the subsets of the datasets shown in FIG. 7B.

As shown in FIGS. 8A-8B, the tables measure the performance of each model using precision, recall, F1-score, mean average precision (MAP), and normalized discounted cumulative gain (NDCG). For each of the metrics, the researchers set k=10. Further, the researchers included a single digital content item in each interaction session. The LinUCB and HLinUCB models represented in FIG. 8B, as well as the various embodiments of the sequential recommender system 106, predicted a single digital content item at each time stamp. The researchers selected the top k items and the metrics calculated by the available ground-truth in test data for the other models.

As shown by the tables of FIGS. 8A-8B, the sequential recommender system 106 provides improved performance over the other models often implemented by conventional systems. With respect to several metrics, the sequential recommender system 106 performs significantly better. Notably, both the Ours(+N)(+F)(3) and Ours(+N)(+F)(5) models provided the best performance out of all tested models in almost every metric with the Ours(+N)(+F)(5) model achieving the highest values for each metric. Thus, as illustrated by the tables, incorporating both negative feedback and the relationships among digital content items in the recommendation process provides a significant advantage of conventional recommendation systems.

Figure 9A:
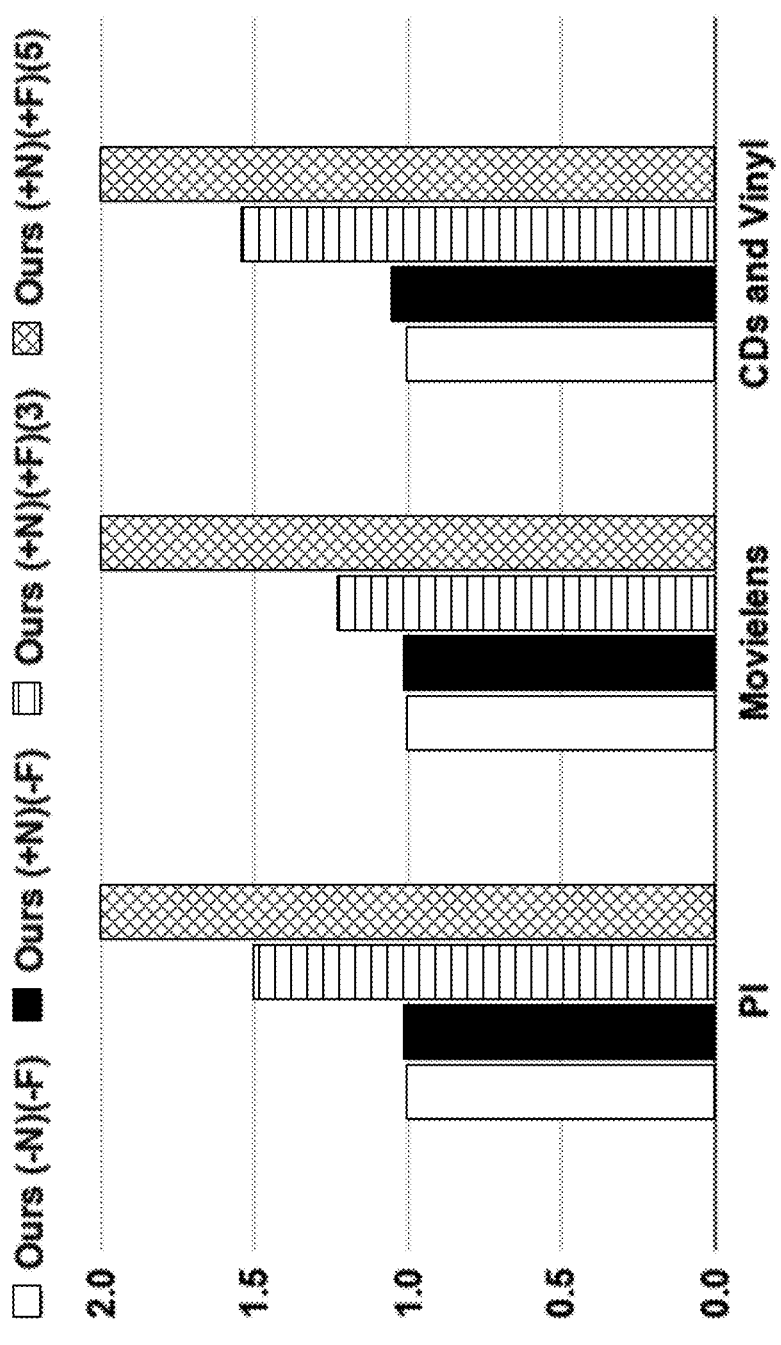
FIGS. 9A-9B illustrate graphs reflecting additional experimental results regarding the effectiveness of the sequential recommender system 106 in accordance with one or more embodiments.
Figure 9B:
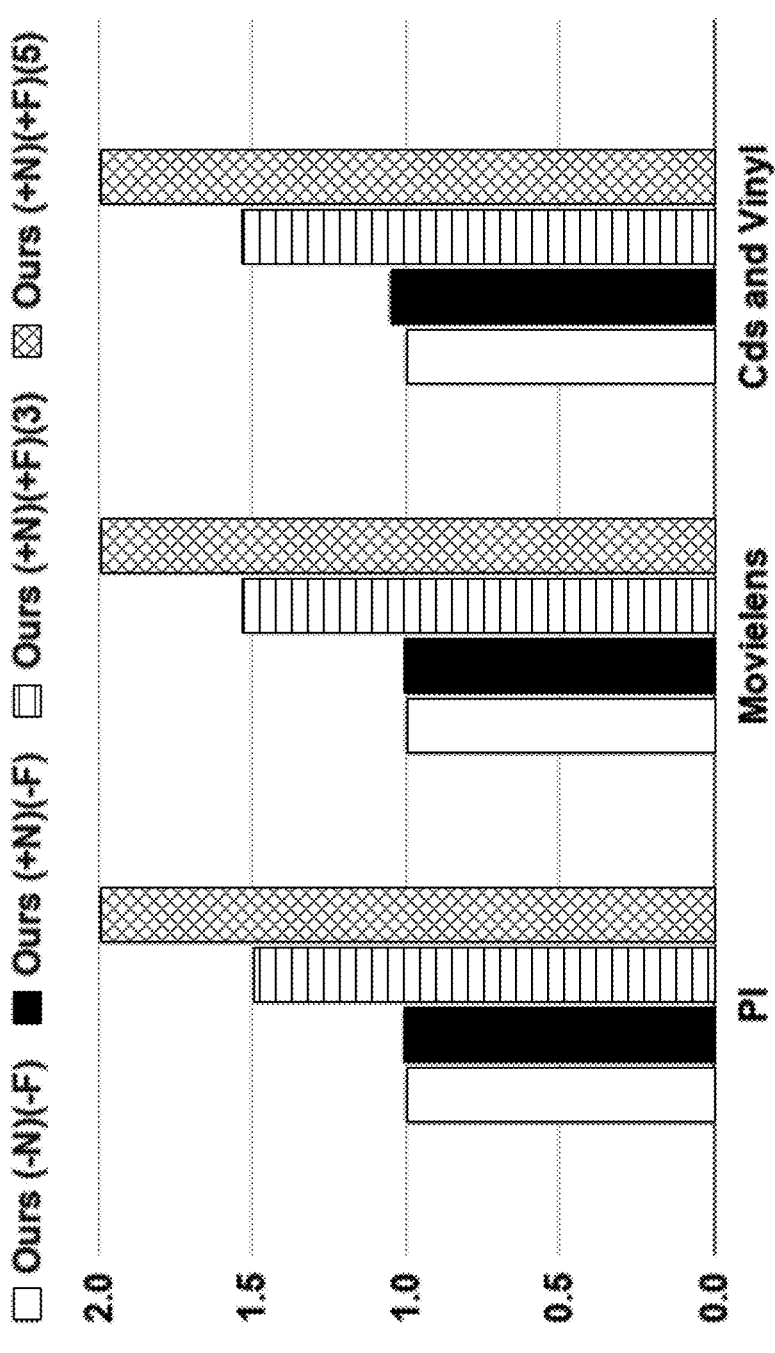

FIGS. 9A-9B illustrate graphs reflecting additional experimental results regarding the effectiveness of the sequential recommender system 106 in accordance with one or more embodiments. In particular, the researchers trained a simulator for ratings predictions using the DeepFM model over the entirety of the datasets and fine-tuned to improve the simulator's accuracy for predicting the unknown ratings. The researchers utilized the simulator, rather than real users, for estimating interactions with digital content items. The researchers utilized two different session lengths and calculated the accumulated reward for each tested embodiment of the sequential recommender system 106.

FIG. 9A illustrates a graph showing the accumulated rewards for all users over ten consecutive interaction sessions. FIG. 9B illustrates a graph showing the accumulated rewards for the users over fifty consecutive interaction sessions. As shown in both graphs, the models that incorporate negative feedback and the relationships between the digital content items (i.e., the Ours(+N)(+F)(3) and Ours(+N)(+F)(5) models) perform significantly better.

Figure 10:
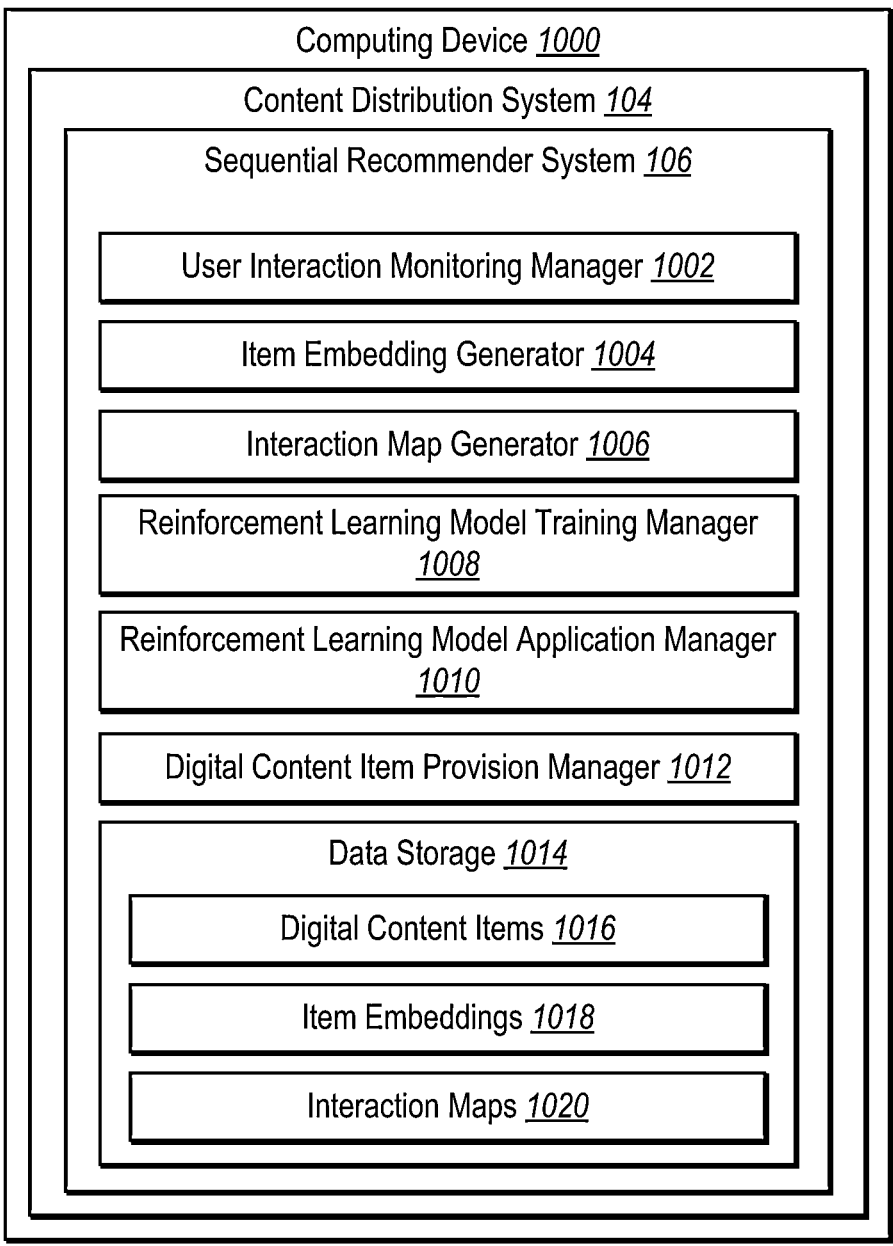
FIG. 10 illustrates an example schematic diagram of a sequential recommender system in accordance with one or more embodiments.

Turning now to FIG. 10, additional detail will now be provided regarding various components and capabilities of the sequential recommender system 106. In particular, FIG. 10 illustrates the sequential recommender system 106 implemented by the computing device 1000 (e.g., the server(s) 102 and/or one of the client devices 110a-110n discussed above with reference to FIG. 1). Additionally, the sequential recommender system 106 is also part of the content distribution system 104. As shown, in one or more embodiments, the sequential recommender system 106 includes, but is not limited to, a user interaction monitoring manager 1002, an item embedding generator 1004, an interaction map generator 1006, a reinforcement learning model training manager 1008, a reinforcement learning model application manager 1010, digital content item provision manager 1012, and data storage 1014 (which includes digital content items 1016, item embeddings 1018, and interaction maps 1020).

As just mentioned, and as illustrated in FIG. 10, the sequential recommender system 106 includes the user interaction monitoring manager 1002. In one or more embodiments, the user interaction monitoring manager 1002 monitors user interactions of a client device with one or more digital content items of a plurality of digital content items during an interaction session. In some embodiments, the user interaction monitoring manager 1002 determines whether a particular user interaction was a positive interaction or a negative interaction. For example, in some cases, where an interaction includes a rating of a digital content item, the user interaction monitoring manager 1002 determines whether the rating satisfies a threshold to qualify as a positive interaction.

Additionally, as shown in FIG. 10, the sequential recommender system 106 includes the item embedding generator 1004. In one or more embodiments, the item embedding generator 1004 generates a set of item embeddings for a plurality of digital content items. For example, in some instances, the item embedding generator 1004 generates collaborative-filtering-item embeddings. In some cases, the item embedding generator 1004 generates graph embeddings for the plurality of digital content items.

Further, as shown in FIG. 10, the sequential recommender system 106 includes the interaction map generator 1006. In one or more embodiments, the interaction map generator 1006 generates interaction maps from the user interactions observed by the user interaction monitoring manager 1002. For example, in some cases, the interaction map generator 1006 generates a positive interaction map from each positive interaction and/or a negative interaction map from each negative interaction. In some implementations, the interaction map generator 1006 further utilizes item embeddings corresponding to other digital content items to generate the interaction maps.

As shown in FIG. 10, the sequential recommender system 106 further includes the reinforcement learning model training manager 1008. In one or more embodiments, the reinforcement learning model training manager 1008 trains a reinforcement learning model to generate recommendations for one or more digital content items to a client device. For instance, in one or more embodiments, the reinforcement learning model training manager 1008 utilizes the TD3 algorithm outlined above the train the reinforcement learning model.

Additionally, as shown in FIG. 10, the sequential recommender system 106 includes the reinforcement learning model application manager 1010. In one or more embodiments, the reinforcement learning model application manager 1010 utilizes the reinforcement learning model trained by the reinforcement learning model training manager 1008 to generate recommendations for a client device. In particular, in some implementations, the reinforcement learning model application manager 1010 utilizes the reinforcement learning model to generate a recommendation based on the user interactions observed by the user interaction monitoring manager 1002, the item embeddings generated by the item embedding generator 1004, and the interaction maps generated by the interaction map generator 1006. In some embodiments, the reinforcement learning model application manager 1010 further utilizes the reinforcement learning model to evaluate the generated recommendation and further modifies parameters of the reinforcement learning model based on the evaluation.

As shown in FIG. 10, the sequential recommender system 106 also includes the digital content item provision manager 1012. In one or more embodiments, the digital content item provision manager 1012 provides the digital content items recommended by the reinforcement learning model for display via a client device.

Further, as shown in FIG. 10, the sequential recommender system 106 includes data storage 1014. In particular, data storage 1014 can be implemented as part of one or more memory-devices that include digital content items 1016, item embeddings 1018, and interaction maps 1020. In one or more embodiments, digital content items 1016 stores a plurality of digital content items, including the digital content items provided for display via a client device. In some embodiments, item embeddings 1018 stores the item embeddings generated by the item embedding generator 1004. In some implementations, interaction maps 1020 stores the interaction maps generated by the interaction map generator 1006.

Each of the components 1002-1020 of the sequential recommender system 106 can include software, hardware, or both. For example, the components 1002-1020 can include one or more instructions stored on a computer-readable storage medium and executable by processors of one or more computing devices, such as a client device or server device. When executed by the one or more processors, the computer-executable instructions of the sequential recommender system 106 can cause the computing device(s) to perform the methods described herein. Alternatively, the components 1002-1020 can include hardware, such as a special-purpose processing device to perform a certain function or group of functions. Alternatively, the components 1002-1020 of the sequential recommender system 106 can include a combination of computer-executable instructions and hardware.

Furthermore, the components 1002-1020 of the sequential recommender system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1020 of the sequential recommender system 106 may be implemented as a stand-alone application, such as a desktop or mobile application. Furthermore, the components 1002-1020 of the sequential recommender system 106 may be implemented as one or more web-based applications hosted on a remote server. Alternatively, or additionally, the components 1002-1020 of the sequential recommender system 106 may be implemented in a suite of mobile device applications or "apps." For example, in one or more embodiments, the sequential recommender system 106 can comprise or operate in connection with digital software applications such as ADOBE® TARGET or ADOBE® MARKETING CLOUD®. The foregoing are either registered trademarks or trademarks of Adobe Inc. in the United States and/or other countries.

FIGS. 1-10, the corresponding text and the examples provide a number of different methods, systems, devices, and non-transitory computer-readable media of the sequential recommender system 106. In addition to the foregoing, one or more embodiments can also be described in terms of flowcharts comprising acts for accomplishing particular results, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for determining one or more digital content items to provide to a client device in accordance with one or more embodiments. While FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts are performed, in a digital medium environment for disseminating digital content, as part of a computer-implemented method for accurately selecting digital content items for computing devices. In some instances, a non-transitory computer-readable medium stores instructions thereon that, when executed by at least one processor, cause a computing device to perform the acts of FIG. 11. In some implementations, a system performs the acts of FIG. 11. For example, in one or more cases, a system includes one or more memory devices comprising a reinforcement learning model comprising an actor model and a critic model. The system further includes one or more server devices configured to cause the system to perform the acts of FIG. 11.

The series of acts 1100 includes an act 1102 of generating item embeddings that encode interactions with a plurality of digital content items. For example, in some embodiments, the act 1102 involves generating, for a plurality of digital content items, a set of item embeddings that encode interactions across client devices associated with the plurality of digital content items. In some implementations, the sequential recommender system 106 generates the set of item embeddings utilizing a factorization machine neural network.

As shown in FIG. 10, the act 1102 includes a sub-act 1104 of generating collaborative-filtering-item embeddings. Indeed, in one or more embodiments, the sequential recommender system 106 generates the set of item embeddings for the plurality of digital content items via collaborative filtering or graph embedding to encode the interactions across the client devices associated with the plurality of digital content items.

As further shown in FIG. 10, the act 1102 includes an alternative sub-act 1106 of generating graph embeddings. For example, in one or more embodiments, the sequential recommender system 106 generates the set of item embeddings for the plurality of digital content items by generating graph embeddings that encode the interactions across the client devices associated with the plurality of digital content items.

Further, the series of acts 1100 includes an act 1108 of monitoring user interactions with one or more digital content items. For instance, in some implementations, the act 1108 involves monitoring user interactions of a client device with one or more digital content items from the plurality of digital content items during an interaction session.

Additionally, the series of acts 1100 includes an act 1110 of determining interaction maps from the user interactions utilizing the item embeddings. For example, in some cases, the act 1110 involves determining, utilizing the set of item embeddings, a negative interaction map and a positive interaction map the user interactions of the client device during the interaction session (e.g., from each negative interaction). In one or more embodiments, the sequential recommender system 106 determines the negative interaction map from each negative interaction from the user interactions of the client device during the interaction session by determining the negative interaction map without sampling a subset of negative interactions.

As shown in FIG. 10, the act 1110 includes a sub-act 1112 of generating a negative interaction map utilizing negative item embeddings. For example, in one or more embodiments, the sequential recommender system 106 determines, utilizing the set of item embeddings, the negative interaction map from each negative interaction from the user interactions by: determining one or more negative item embeddings by determining an item embedding for each negative interaction from the user interactions; determining one or more additional negative item embeddings based on a proximity to the one or more negative item embeddings within an item embedding space; and generating the negative interaction map utilizing the one or more negative item embeddings and the one or more additional negative item embeddings.

As further shown in FIG. 10, the act 1110 includes an alternative sub-act 1114 of generating a positive interaction map utilizing positive item embeddings. For example, in one or more embodiments, the sequential recommender system 106 determines, utilizing the set of item embeddings, the positive interaction map from each negative interaction from the user interactions by: determining one or more negative item embeddings by determining an item embedding for each negative interaction from the user interactions; determining one or more positive item embeddings based on a distance from the one or more negative item embeddings within an item embedding space; and generating the positive interaction map utilizing the one or more positive item embeddings. As another example, in one or more embodiments, the sequential recommender system 106 determines, utilizing the set of item embeddings, the positive interaction map by: determining one or more positive item embeddings by determining an item embedding for each positive interaction from the user interactions; determining one or more additional positive item embeddings based on a proximity to the one or more positive item embeddings within an item embedding space; and generating the positive interaction map utilizing the one or more positive item embeddings and the one or more additional positive item embeddings.

The series of acts 1100 also includes an act 1116 determining additional digital content items to provide for display. For example, in one or more embodiments, the act involves determining, utilizing a reinforcement learning model, one or more additional digital content items from the plurality of digital content items to provide for display based on the set of item embeddings, the negative interaction map, and the positive interaction map.

In one or more embodiments, the sequential recommender system 106 determines, utilizing the reinforcement learning model, the one or more additional digital content items by: generating, utilizing a first convolutional gated recurrent unit neural network layer of the reinforcement learning model, a negative state for the client device based on the negative interaction map; and generating, utilizing a second convolutional gated recurrent unit neural network layer of the reinforcement learning model, a positive state for the client device based on the positive interaction map. In some instances, the sequential recommender system 106 further determines, utilizing the reinforcement learning model, the one or more additional digital content items by determining, utilizing the reinforcement learning model, the one or more additional digital content items based on the negative state, the positive state, and the set of item embeddings. In some instances, the sequential recommender system 106 determines, utilizing the reinforcement learning model, the one or more additional digital content items based on the negative state, the positive state, and the set of item embeddings by: generating a first similarity metric between the positive state and the set of item embeddings; generating a second similarity metric between the negative state and the set of item embeddings; and determining the one or more additional digital content items utilizing the first similarity metric and the second similarity metric.

In some embodiments, the series of acts 1100 further includes acts for modifying the reinforcement learning model and using the modified reinforcement learning model to determine more digital content items for the client device. For example, in some implementations, the acts include determining, utilizing the reinforcement learning model, the one or more additional digital content items by determining the one or more additional digital content items utilizing an actor model of the reinforcement learning model; determining a value function for the one or more additional digital content items utilizing a critic model of the reinforcement learning model, the critic model comprising a plurality of rectified linear interaction neural network layers; and modifying parameters of the reinforcement learning model using the value function. In some cases, the acts further include monitoring additional user interactions of the client device with the one or more additional digital content items during an additional interaction session; and determining, utilizing the reinforcement learning model having the modified parameters, one or more other digital content items from the plurality of digital content items to provide for display based on the set of item embeddings and the additional user interactions.

To provide an illustration, in one or more embodiments, the sequential recommender system 106 monitors user interactions of a client device with one or more digital content items from the plurality of digital content items during an interaction session; determines, utilizing a set of item embeddings that encode interactions with a plurality of digital content items across client devices, a negative interaction map and a positive interaction map from the user interactions of the client device during the interaction session; generates, utilizing convolutional gated recurrent unit neural network layers of a reinforcement learning model, a negative state for the client device based on the negative interaction map and a positive state for the client device based on the positive interaction map; determines, utilizing the reinforcement learning model, one or more additional digital content items from the plurality of digital content items based on the set of item embeddings, the negative state, and the positive state; and provides the one or more additional digital content items for display via the client device.

In some implementations, the sequential recommender system 106 determines a previous negative state for the client device and a previous positive state for the client device; and generates, utilizing the convolutional gated recurrent unit neural network layers of the reinforcement learning model, the negative state for the client device based on the previous negative state and the positive state for the client device based on the previous positive state.

In some cases, the sequential recommender system 106 determines, utilizing the set of item embeddings, the negative interaction map from the user interactions of the client device during the interaction session by: determining one or more positive item embeddings by determining an item embedding for each positive interaction from the user interactions; determining one or more negative item embeddings based on a distance from the one or more positive item embeddings within an item embedding space; and generating the negative interaction map utilizing the one or more negative item embeddings.

To provide another example, in one or more embodiments, the sequential recommender system 106 generates interaction maps from user interactions of a client device with one or more digital content items from a plurality of digital content items during an interaction session; determines, utilizing the actor model of the reinforcement learning model and based on the interaction maps, a positive state for the client device, a negative state for the client device, and one or more additional digital content items from the plurality of digital content items to provide for display via the client device; and generates, utilizing the critic model of the reinforcement learning model, a value function to modify parameters of the actor model by: determining a first state-action vector utilizing the positive state and a second state-action vector utilizing the negative state; and generating the value function based on the first state-action vector and the second state-action vector.

In some cases, the sequential recommender system 106 generates the value function based on the first state-action vector and the second state-action vector by: determining, utilizing a first rectified linear interaction neural network layer, a first set of feature values based on the first state-action vector; determining, utilizing a second rectified linear interaction neural network layer, a second set of feature values based on the second state-action vector; and generating, utilizing a third rectified linear interaction neural network layer, the value function based on the first set of feature values and the second set of feature values.

In some cases, the sequential recommender system 106 determines the first state-action vector utilizing the positive state and the second state-action vector utilizing the negative state by: determining the first state-action vector utilizing the positive state and the one or more additional digital content items; and determining the second state-action vector utilizing the negative state and the one or more additional digital content items. In some implementations, the sequential recommender system 106 generates an action vector utilizing item embeddings corresponding to the one or more additional digital content items; determines the first state-action vector utilizing the positive state and the one or more additional digital content items by determining the first state-action vector by combining the action vector and the positive state; and determines the second state-action vector utilizing the negative state and the one or more additional digital content items by determining the second state-action vector by combining the action vector and the negative state.

In some cases, the sequential recommender system 106 further monitors additional user interactions of the client device with the one or more additional digital content items during an additional interaction session; and determines, utilizing the actor model having the modified parameters, one or more other digital content items from the plurality of digital content items to provide for display based on the additional user interactions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
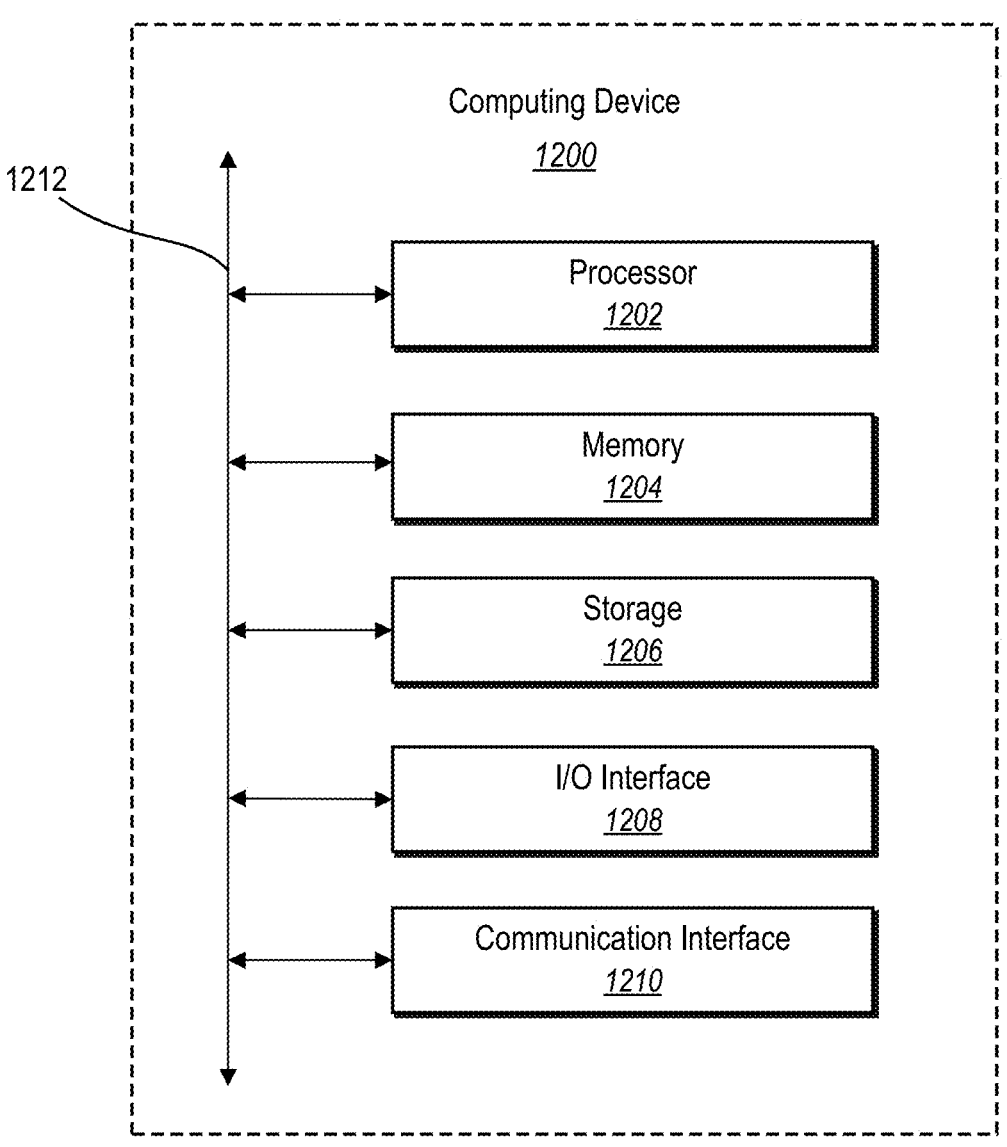
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, the client devices 110a-110n, and/or the third-party server 114). In one or more embodiments, the computing device 1200 may be a mobile device (e.g., a mobile telephone, a smartphone, a PDA, a tablet, a laptop, a camera, a tracker, a watch, a wearable device). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:

generating, for a plurality of digital content items, a set of item embeddings that encode interactions across client devices associated with the plurality of digital content items;

monitoring user interactions of a client device with one or more digital content items from the plurality of digital content items during an interaction session;

determining, utilizing the set of item embeddings, a negative interaction map and a positive interaction map from the user interactions of the client device during the interaction session by:

determining the positive interaction map or the negative interaction map using, from the set of item embeddings, item embeddings that correspond to the user interactions of the client device during the interaction session; and determining at least one of the positive interaction map or the negative interaction map using, from the set of item embeddings, additional item embeddings selected based on distances within an item embedding space between the additional item embeddings and the item embeddings that correspond to the user interactions, the additional item embeddings corresponding to digital content items with which the client device did not interact during the interaction session;

determining, utilizing a reinforcement learning model, one or more additional digital content items from the plurality of digital content items to provide for display by:

generating, utilizing a first convolutional gated recurrent unit neural network layer of the reinforcement learning model, a negative state for the client device based on the negative interaction map;

generating, utilizing a second convolutional gated recurrent unit neural network layer of the reinforcement learning model, a positive state for the client device based on the positive interaction map; and generating a recommendation for the one or more additional digital content items based on the set of item embeddings, the negative state, and the positive state;

determining, using one or more rectified linear interaction neural network layers of the reinforcement learning model, a value function indicating a measure of quality of the one or more additional digital content items; and modifying parameters of the reinforcement learning model using the value function.

2. The non-transitory computer-readable medium of claim 1, wherein:

determining the positive interaction map or the negative interaction map using the item embeddings that correspond to the user interactions comprises determining, for the negative interaction map and from the set of item embeddings, one or more negative item embeddings by determining an item embedding for each negative interaction from the user interactions; and determining at least one of the positive interaction map or the negative interaction map using the additional item embeddings selected based on the distances within the item embedding space comprises determining, for the negative interaction map and from the set of item embeddings, one or more additional negative item embeddings based on a proximity to the one or more negative item embeddings within the item embedding space.

3. The non-transitory computer-readable medium of claim 1, wherein modifying the parameters of the reinforcement learning model using the value function comprises:

modifying, using the value function, a first set of parameters for the first convolutional gated recurrent unit neural network layer; and modifying, using the value function, a second set of parameters for the second convolutional gated recurrent unit neural network layer.

4. The non-transitory computer-readable medium of claim 3, wherein:

modifying, using the value function, the first set of parameters for the first convolutional gated recurrent unit neural network layer comprises back propagating the value function to the first convolutional gated recurrent unit neural network layer; and modifying, using the value function, the second set of parameters for the second convolutional gated recurrent unit neural network layer comprises back propagating the value function to the second convolutional gated recurrent unit neural network layer.

5. The non-transitory computer-readable medium of claim 1, wherein determining, utilizing the reinforcement learning model, the one or more additional digital content items based on the negative state, the positive state, and the set of item embeddings comprises:

generating a first similarity metric between the positive state and the set of item embeddings;

generating a second similarity metric between the negative state and the set of item embeddings; and determining the one or more additional digital content items utilizing the first similarity metric and the second similarity metric.

6. The non-transitory computer-readable medium of claim 1, wherein generating the set of item embeddings for the plurality of digital content items comprises generating the set of item embeddings via collaborative filtering or graph embedding to encode the interactions across the client devices associated with the plurality of digital content items.

7. The non-transitory computer-readable medium of claim 1, wherein:

determining the positive interaction map or the negative interaction map using the item embeddings that correspond to the user interactions comprises determining, for the negative interaction map and from the set of item embeddings, one or more negative item embeddings by determining an item embedding for each negative interaction from the user interactions; and determining at least one of the positive interaction map or the negative interaction map using the additional item embeddings selected based on the distances within the item embedding space comprises determining, for the positive interaction map and from the set of item embeddings, one or more positive item embeddings based on a distance from the one or more negative item embeddings within the item embedding space.

8. The non-transitory computer-readable medium of claim 1, wherein determining the negative interaction map from the user interactions of the client device during the interaction session comprises determining the negative interaction map without sampling a subset of negative interactions from the user interactions.

9. The non-transitory computer-readable medium of claim 1, wherein:

generating, utilizing the first convolutional gated recurrent unit neural network layer, the negative state for the client device based on the negative interaction map comprises generating, using the first convolutional gated recurrent unit neural network layer having a set of shared weights, the negative state for the client device based on the negative interaction map and a previous negative state corresponding to a previous interaction session of the client device; and generating, utilizing the second convolutional gated recurrent unit neural network layer, the positive state for the client device based on the positive interaction map comprises generating, using the second convolutional gated recurrent unit neural network layer having the set of shared weights, the positive state for the client device based on the positive interaction map and a previous positive state corresponding to the previous interaction session of the client device.

10. The non-transitory computer-readable medium of claim 9, wherein determining at least one of the positive interaction map or the negative interaction map using the additional item embeddings corresponding to the digital content items with which the client device did not interact during the interaction session comprises using the additional item embeddings to determine the positive interaction map and the negative interaction map.

11. The non-transitory computer-readable medium of claim 1, wherein:

determining the positive interaction map or the negative interaction map using the item embeddings that correspond to the user interactions comprises determining, for the positive interaction map and from the set of item embeddings, one or more positive item embeddings by determining an item embedding for each positive interaction from the user interactions; and determining at least one of the positive interaction map or the negative interaction map using the additional item embeddings selected based on the distances within the item embedding space comprises determining, for the positive interaction map and from the set of item embeddings, one or more additional positive item embeddings based on a proximity to the one or more positive item embeddings within the item embedding space.

12. A computer-implemented method comprising:

monitoring user interactions of a client device with one or more digital content items from a plurality of digital content items during an interaction session;

determining, utilizing a set of item embeddings that encode interactions with the plurality of digital content items across client devices, a negative interaction map and a positive interaction map from the user interactions of the client device during the interaction session by:

determining the positive interaction map or the negative interaction map using, from the set of item embeddings, item embeddings that correspond to the user interactions of the client device during the interaction session; and determining at least one of the positive interaction map or the negative interaction map using, from the set of item embeddings, additional item embeddings selected based on distances within an item embedding space between the additional item embeddings and the item embeddings that correspond to the user interactions, the additional item embeddings corresponding to digital content items with which the client device did not interact during the interaction session;

generating, utilizing a first convolutional gated recurrent unit neural network layer of a reinforcement learning model, a negative state for the client device based on the negative interaction map;

generating, utilizing a second convolutional gated recurrent unit neural network layer of the reinforcement learning model, a positive state for the client device based on the positive interaction map;

determining, utilizing the reinforcement learning model, one or more additional digital content items from the plurality of digital content items based on the set of item embeddings, the negative state, and the positive state;

providing the one or more additional digital content items for display via the client device;

determining, using one or more rectified linear interaction neural network layers of the reinforcement learning model, a value function indicating a measure of quality of the one or more additional digital content items provided for display; and modifying parameters of the reinforcement learning model using the value function.

13. The computer-implemented method of claim 12, further comprising:

determining a previous negative state for the client device and a previous positive state for the client device, wherein generating, utilizing the first convolutional gated recurrent unit neural network layer, the negative state for the client device based on the negative interaction map comprises generating, utilizing the first convolutional gated recurrent unit neural network layer, the negative state based on the negative interaction map and the previous negative state; and wherein generating, utilizing the second convolutional gated recurrent unit neural network layer, the positive state for the client device based on the positive interaction map comprises generating, utilizing the second convolutional gated recurrent unit neural network layer, the positive state based on the positive interaction map and the previous positive state.

14. The computer-implemented method of claim 12, further comprising generating the set of item embeddings utilizing a factorization machine neural network.

15. The computer-implemented method of claim 12, wherein:

determining the positive interaction map or the negative interaction map using the item embeddings that correspond to the user interactions comprises determining, for the positive interaction map and from the set of item embeddings, one or more positive item embeddings by determining an item embedding for each positive interaction from the user interactions; and determining at least one of the positive interaction map or the negative interaction map using the additional item embeddings selected based on the distances within the
item embedding space comprises determining, for the
negative interaction map and from the set of item
embeddings, one or more negative item embeddings
based on a distance from the one or more positive item embeddings within an item embedding space.

16. A system comprising:
one or more memory devices; and
one or more server devices configured to cause the system
to:
generate interaction maps from user interactions of a
client device with one or more digital content items
from a plurality of digital content items during an
interaction session by:
determining a positive interaction map or a negative
interaction map using item embeddings that cor-
respond to the user interactions of the client device
during the interaction session; and
determining at least one of the positive interaction
map or the negative interaction map using additional item embeddings selected based on dis-
tances within an item embedding space between
the additional item embeddings and the item
embeddings that correspond to the user interac-
tions, the additional item embeddings corresponding to digital content items with which the client
device did not interact during the interaction ses-
sion;
determine, utilizing an actor model of a reinforcement
learning model and based on the interaction maps,
one or more additional digital content items from the
plurality of digital content items to provide for
display via the client device by:
generating, utilizing a first convolutional gated
recurrent unit neural network layer of the actor
model, a negative state for the client device based
on the interaction maps; and
generating, utilizing a second convolutional gated
recurrent unit neural network layer of the actor
model, a positive state for the client device based
on the interaction maps;
determining to provide the one or more additional
digital content items for display via the client device
based on the positive state and the negative state; and
generate, utilizing a critic model of the reinforcement
learning model, a value function to modify param-
eters of the actor model by:
determining a first state-action vector utilizing the
positive state and a second state-action vector
utilizing the negative state; and
generating, utilizing one or more rectified linear
interaction neural network layers of the critic model, the value function based on the first state-
action vector and the second state-action vector.

17. The system of claim 16, wherein generating, utilizing
the one or more rectified linear interaction neural network
layers, the value function based on the first state-action
vector and the second state-action vector comprises:
determining, utilizing a first rectified linear interaction
neural network layer, a first set of feature values based
on the first state-action vector;
determining, utilizing a second rectified linear interaction
neural network layer, a second set of feature values
based on the second state-action vector; and
generating, utilizing a third rectified linear interaction
neural network layer, the value function based on the
first set of feature values and the second set of feature
values.

18. The system of claim 16, wherein the one or more
server devices are further configured to cause the system to:
monitor additional user interactions of the client device
with the one or more additional digital content items
during an additional interaction session; and
determine, utilizing the actor model having the modified
parameters, one or more other digital content items
from the plurality of digital content items to provide for
display based on the additional user interactions.

19. The system of claim 16, wherein determining the first
state-action vector utilizing the positive state and the second
state-action vector utilizing the negative state comprises:
determining the first state-action vector utilizing the posi-
tive state and the one or more additional digital content
items; and
determining the second state-action vector utilizing the
negative state and the one or more additional digital
content items.

20. The system of claim 19, wherein:
the one or more server devices are further configured to
cause the system to generate an action vector utilizing
item embeddings corresponding to the one or more
additional digital content items;
determining the first state-action vector utilizing the posi-
tive state and the one or more additional digital content
items comprises determining the first state-action vec-
tor by combining the action vector and the positive
state; and
determining the second state-action vector utilizing the
negative state and the one or more additional digital
content items comprises determining the second state-
action vector by combining the action vector and the
negative state.

* * * * *